(12) United States Patent
Ramaswami et al.

(10) Patent No.: US 7,742,963 B2
(45) Date of Patent: *Jun. 22, 2010

(54) METHODS AND SYSTEMS FOR ANALYZING AND PREDICTING MARKET WINNERS AND LOSERS

(75) Inventors: Murali Ramaswami, Westport, CT (US); James Hosker, New York, NY (US)

(73) Assignee: Barclays Capital Inc., New York, NY (US)

( * ) Notice: Subject to any disclaimer, the term of this patent is extended or adjusted under 35 U.S.C. 154(b) by 814 days.

This patent is subject to a terminal disclaimer.

(21) Appl. No.: 11/498,007

(22) Filed: Aug. 1, 2006

(65) Prior Publication Data

US 2007/0033125 A1 Feb. 8, 2007

Related U.S. Application Data

(63) Continuation of application No. 09/711,124, filed on Nov. 10, 2000, now Pat. No. 7,263,502.

(51) Int. Cl.
*G06Q 40/00* (2006.01)

(52) U.S. Cl. ..................................... 705/35; 705/36 R
(58) Field of Classification Search ................... 705/35, 705/36 R
See application file for complete search history.

(56) References Cited

U.S. PATENT DOCUMENTS

| | | | | |
|---|---|---|---|---|
| 6,088,685 | A * | 7/2000 | Kiron et al. | 705/36 R |
| 7,020,629 | B1 * | 3/2006 | Kihn | 705/36 R |
| 7,356,501 | B2 * | 4/2008 | Churquina | 705/37 |
| 7,496,531 | B1 * | 2/2009 | Gastineau et al. | 705/35 |

FOREIGN PATENT DOCUMENTS

EP 1109122 * 6/2001

* cited by examiner

*Primary Examiner*—Thomas A Beach
(74) *Attorney, Agent, or Firm*—Morgan Lewis & Bockius LLP

(57) ABSTRACT

The present invention relates to a tool for selecting winners and losers based on their market position using a volume/turnover filter. Using the present tool, investors may predict when to hold some stocks long and others short over various time period, thereby maximizing the profitability of a portfolio.

32 Claims, 33 Drawing Sheets

| Month-End Formation | Price Momentum Winners | EM Model Winners | Price Momentum (Winners-Losers) | EM Model (Winners-Losers) | SPX |
|---|---|---|---|---|---|
| Jan, April, July, Oct | 25.0% | 25.5% | 11.5% | 14.9% | 14.8% |
| Feb, May, Aug, Nov | 26.1% | 30.2% | 13.3% | 17.1% | 15.7% |
| Mar, Jun, Sep, Dec | 26.5% | 28.7% | 13.7% | 15.6% | 16.8% |

| Month-End Formation | Price Momentum Winners | EM Model Winners | Price Momentum (Winners −Losers) | EM Model (Winners −Losers) | SPX |
|---|---|---|---|---|---|
| Jan, July | 26.8% | 27.8% | 13.9% | 14.2% | 15.3% |
| Feb, Aug | 27.1% | 25.4% | 14.9% | 9.4% | 16.3% |
| Mar, Sep | 21.1% | 24.0% | 5.3% | 7.4% | 16.2% |
| April, Oct | 21.4% | 23.5% | 5.0% | 6.7% | 15.9% |
| May, Nov | 26.1% | 30.2% | 12.4% | 18.7% | 15.1% |
| Jun, Dec | 27.0% | 28.7% | 13.4% | 15.9% | 15.8% |

| Stocks for Dec 31, 1999 Winners | S&P 500 Winners Sectors | Stock in Sept 30, 1999 Winners | Stocks for Dec 31, 1999 Losers | S&P 500 Losers Sectors | Stock in Sept 30, 1999 Losers |
|---|---|---|---|---|---|
| AOL | Technology | Yes | GT | Consumer Cyclical | No |
| YHOO | Technology | No | ALL | Financial | Yes |
| TLAB | Technology | Yes | CTX | Consumer Cyclical | No |
| CSCO | Technology | Yes | HUM | Health Care | No |
| CBS | Consumer Staple | Yes | PGR | Financial | Yes |
| --- | --- | --- | MCK | Consumer Staple | Yes |
| GTW | Technology | No | OWC | Consumer Cyclical | No |
| MWD | Financial | Yes | UN | Consumer Staple | No |
| AAPL | Technology | No | JCP | Consumer Cyclical | No |
| TXN | Technology | Yes | SAFC | Financial | No |
| ADPT | Technology | No | QTRN | Health Care | No |
| BMCS | Technology | No | LMT | Capital Goods | No |
| AMGN | Health Care | Yes | WPI | Health Care | Yes |
| PEB | Technology | Yes | MAT | Consumer Cyclical | Yes |
| SFA | Technology | Yes | ALT | Basic Industry | No |
| SLR | Capital Goods | No | HLT | Consumer Cyclical | No |
| EMC | Technology | Yes | WMI | Capital Goods | Yes |
| SUNW | Technology | Yes | MO | Consumer Staple | No |
| TER | Technology | Yes | RTNB | Technology | No |
| AMAT | Technology | No | DNY | Consumer Staple | No |
| FCX | Basic Industry | No | AM | Consumer Cyclical | Yes |
| RDC | Energy | No | RAD | Consumer Staple | Yes |
| AA | Basic Industry | No | MDR | Capital Goods | Yes |
| KLAC | Technology | Yes | XRX | Technology | No |
| NTAP | Technology | No | SRV | Consumer Cyclical | Yes |

FIG.7

| Three-Month Holding Periods | EM Winners | SPX |
|---|---|---|
| Jan, April, July, Oct | 0.57 | 0.39 |
| Feb, May, Aug, Nov | 0.75 | 0.43 |
| Mar, Jun, Sep, Dec | 0.67 | 0.43 |

FIG.8

| Three-Month Holding Periods | EM Long Winners Short Losers | Three-Month Libor |
|---|---|---|
| Jan, April, July, Oct | 14.9% | 5.43 % |
| Feb, May, Aug, Nov | 17.1% | 5.45% |
| Mar, Jun, Sep, Dec | 15.6% | 5.43% |

FIG.9

| Six-Month Holding Periods | EM Winners | SPX |
|---|---|---|
| Jan, July | 0.94 | 0.64 |
| Feb, Aug | 0.90 | 0.62 |
| Mar, Sep | 0.77 | 0.53 |
| April, Oct | 0.96 | 0.60 |
| May, Nov | 1.10 | 0.61 |
| Jun, Dec | 0.96 | 0.68 |

FIG.10

| Six-Month Holding Periods | EM Long Winners Short Losers | Six-Month Libor |
|---|---|---|
| Jan, July | 14.2% | 5.50% |
| Feb, Aug | 9.4% | 5.52% |
| Mar, Sep | 7.4% | 5.28% |
| April, Oct | 6.7% | 5.52% |
| May, Nov | 18.7% | 5.56% |
| Jun, Dec | 15.9% | 5.51% |

FIG.11

| Month-End Formation Date | EM Winners | EM Losers | EM Winners –Losers | SPX |
|---|---|---|---|---|
| January | 4.7% | 7.5% | -2.8% | 3.5% |
| February | 5.7% | 7.7% | -2.0% | 4.0% |
| March | 6.1% | 6.0% | 0.1% | 4.7% |
| April | 7.3% | 2.0% | 5.3% | 4.3% |
| May | 5.6% | -4.1% | 9.7% | 0.3% |
| June | 4.3% | -5.3% | 9.6% | -0.2% |
| July | 2.5% | -5.9% | 8.4% | 0.0% |
| August | 7.3% | -0.3% | 7.6% | 5.0% |
| September | 8.4% | 3.8% | 4.6% | 7.2% |
| October | 11.0% | 7.0% | 4.0% | 6.9% |
| November | 11.6% | 9.7% | 1.9% | 6.4% |
| December | 10.0% | 8.6% | 1.4% | 5.0% |

FIG.21

| Month-End Formation Date | EM Winners | EM Losers | EM Winners –Losers | SPX |
|---|---|---|---|---|
| January | 12.8% | 10.5% | 2.3% | 7.9% |
| February | 9.2% | 4.8% | 4.4% | 4.6% |
| March | 8.7% | 3.4% | 5.3% | 4.6% |
| April | 10.2% | -2.0% | 12.2% | 4.1% |
| May | 14.8% | -4.4% | 19.1% | 4.7% |
| June | 14.4% | -1.2% | 15.6% | 6.4% |
| July | 15.0% | 3.0% | 11.9% | 7.4% |
| August | 16.2% | 11.2% | 5.0% | 11.9% |
| September | 15.3% | 13.2% | 2.1% | 11.6% |
| October | 13.3% | 18.8% | -5.6% | 11.8% |
| November | 15.4% | 15.8% | -0.4% | 10.4% |
| December | 14.3% | 14.0% | 0.3% | 9.4% |

FIG.22

| Month-End Formation Date | EM Winners | EM Losers | EM Winners -Losers | SPX |
|---|---|---|---|---|
| January | 47.4% | 75.3% | -27.9% | 35.3% |
| February | 57.1% | 77.3% | -20.2% | 39.6% |
| March | 60.6% | 59.8% | 0.8% | 47.2% |
| April | 72.8% | 19.7% | 53.1% | 43.2% |
| May | 56.2% | -41.0% | 97.2% | 3.0% |
| June | 42.7% | -52.9% | 95.6% | -1.6% |
| July | 25.2% | -59.1% | 84.3% | 0.0% |
| August | 72.9% | -2.6% | 75.5% | 49.8% |
| September | 84.0% | 38.3% | 45.7% | 72.5% |
| October | 109.7% | 70.1% | 39.6% | 69.4% |
| November | 104.0% | 87.7 | 16.3% | 57.8% |
| December | 89.8% | 77.2% | 12.6% | 44.9% |

FIG.29

| Month-End Formation Date | EM Winners | EM Losers | EM Winners -Losers | SPX |
|---|---|---|---|---|
| January | 128.0% | 105.2% | 22.8% | 79.0% |
| February | 92.3% | 48.4% | 43.9% | 46.3% |
| March | 86.8% | 33.6% | 53.2% | 46.0% |
| April | 102.2% | -20.2% | 122.4% | 41.2% |
| May | 147.8% | -43.5% | 191.3% | 47.0% |
| June | 143.8% | -12.0% | 155.8% | 63.8% |
| July | 149.6% | 30.2% | 119.4% | 73.5% |
| August | 145.9% | 101.0% | 44.9% | 107.2% |
| September | 137.3% | 118.8% | 18.5% | 104.2% |
| October | 119.4% | 169.4% | -50.0% | 106.2% |
| November | 138.3% | 142.1% | -3.8% | 93.9% |
| December | 129.1% | 126.1% | 3.0% | 84.6% |

FIG.30

Introducing the Lehman Enhanced Momentum (LEM)

Returns of the Six Possible Lehman Winners and Losers Portfolios Compared to the S&P 500 Benchmark from the Creation of the Portfolio through the Market Correction of August 31, 1998

Introducing the Lehman Enhanced Momentum (LEM)
Returns of the Six Possible Lehman Winners and Losers Portfolios Compared to the S&P 500 Benchmark from the Creation of the Portfolio through the Market Correction of August 31, 1998

Introducing the Lehman Enhanced Momentum (LEM)
Returns of the Six Possible Lehman Winners and Losers Portfolios Compared to the S&P 500 Benchmark from the Creation of the Portfolio through the Market Correction of October 27, 1997

Introducing the Lehman Enhanced Momentum (LEM)

Returns of the Six Possible Lehman Winners and Losers Portfolios Compared to the S&P 500 Benchmark from the Creation of the Portfolio through the Market Correction of October 27, 1997

Introducing the Lehman Enhanced Momentum (LEM)

Returns of the Six Possible Lehman Winners and Losers Portfolios Compared to the S&P 500 Benchmark from the Creation of the Portfolio through the Market Correction of January 4, 2000

Introducing the Lehman Enhanced Momentum (LEM)
Returns of the Six Possible Lehman Winners and Losers Portfolios Compared to the S&P 500 Benchmark from the Creation of the Portfolio through the Market Correction of January 4, 2000

| Month-End Formation Date | EM Winners | EM Losers | EM Winners -Losers | SPX | EM Winners -SPX |
|---|---|---|---|---|---|
| January | 4.7% | 7.5% | -2.8% | 3.5% | 1.2% |
| February | 5.7% | 7.7% | -2.0% | 4.0% | 1.7% |
| March | 6.1% | 6.0% | 0.1% | 4.7% | 1.4% |
| April | 7.3% | 2.0% | 5.3% | 4.3% | 3.0% |
| May | 5.6% | -4.1% | 9.7% | 0.3% | 5.3% |
| June | 4.3% | -5.3% | 9.6% | -0.2% | 4.5% |
| July | 2.5% | -5.9% | 8.4% | 0.0% | 2.5% |
| August | 7.3% | -0.3% | 7.6% | 5.0% | 2.3% |
| September | 8.4% | 3.8% | 4.6% | 7.2% | 1.2% |
| October | 11.0% | 7.0% | 4.0% | 6.9% | 4.1% |
| November | 11.6% | 9.7% | 1.9% | 6.4% | 5.2% |
| December | 10.0% | 8.6% | 1.4% | 5.0% | 5.0% |

FIG.41

| Month-End Formation Date | EM Winners | EM Losers | EM Winners -Losers | SPX | EM Winners -SPX |
|---|---|---|---|---|---|
| January | 12.8% | 10.5% | 2.3% | 7.9% | 4.9% |
| February | 9.2% | 4.8% | 4.4% | 4.6% | 4.6% |
| March | 8.7% | 3.4% | 5.3% | 4.6% | 4.1% |
| April | 10.2% | -2.0% | 12.2% | 4.1% | 6.1% |
| May | 14.8% | -4.4% | 19.1% | 4.7% | 10.1% |
| June | 14.4% | -1.2% | 15.6% | 6.4% | 8.0% |
| July | 15.0% | 3.0% | 11.9% | 7.4% | 7.6% |
| August | 16.2% | 11.2% | 5.0% | 11.9% | 4.3% |
| September | 15.3% | 13.2% | 2.1% | 11.6% | 3.7% |
| October | 13.3% | 18.8% | -5.6% | 11.8% | 1.5% |
| November | 15.4% | 15.8% | -0.4% | 10.4% | 5.0% |
| December | 14.3% | 14.0% | 0.3% | 9.4% | 4.9% |

FIG.42

| Three-Month Holding Periods | Excess Return 1998 | Excess Return 1999 | Average Over The Years |
|---|---|---|---|
| Jan, April, July, Oct | 0.97% | 0.49% | 0.73% |
| Feb, May, Aug, Nov | 1.10% | 1.37% | 1.23% |
| Mar, June, Sep, Dec | 1.15% | 1.48% | 1.31% |

FIG.45

| Six-Month Holding Periods | Excess Return 1998 | Excess Return 1999 | Average Over The Years |
|---|---|---|---|
| Jan, July | 0.94% | 1.05% | 1.00% |
| Feb, Aug | 1.32% | 1.78% | 1.55% |
| Mar, Sep | 1.11% | 1.42% | 1.26% |
| April, Oct | 0.51% | --- | ---- |
| May, Nov | 0.63% | --- | ---- |
| Jun, Dec | 0.85% | --- | ---- |

FIG.46

| Three-Month Holding Periods | Tracking 1998 | Tracking 1999 | Averge Over The Years |
|---|---|---|---|
| Jan, April, July, Oct | 0.33% | 0.60% | 0.47% |
| Feb, May, Aug, Nov | 0.38% | 0.57% | 0.48% |
| Mar, June, Sep, Dec | 0.47% | 0.59% | 0.53% |

FIG.47

| Six-Month Holding Periods | Tracking 1998 | Tracking 1999 | Average Over The Years |
|---|---|---|---|
| Jan, July | 0..33% | 0.59% | 0.46% |
| Feb, Aug | 0.37% | 0.57% | 0.47% |
| Mar, Sep | 0.48% | 0.55% | 0.52% |
| April, Oct | 0.33% | --- | ---- |
| May, Nov | 0.39% | --- | ---- |
| Jun, Dec | 0.47% | --- | ---- |

FIG.48

METHODS AND SYSTEMS FOR ANALYZING AND PREDICTING MARKET WINNERS AND LOSERS

CROSS REFERENCE TO RELATED APPLICATIONS

This application is a continuation application of U.S. patent application Ser. No. 09/711,124, filed Nov. 10, 2000, now issued as U.S. Pat. No. 7,263,502. The entire contents of that application are incorporated herein by reference.

BACKGROUND OF THE INVENTION

1. Technical Field

The invention relates to methods and financial systems for analyzing and predicting market winners and market losers. More particularly, the present invention allows portfolio managers to select winners and losers by using a volume/turnover filter together with price momentum and make better informed decisions regarding whether and what to trade, thereby adding value to the trading process. Traders should find the present invention useful in helping them decide what issues should be held long verses short to maximize profits.

2. Conventional Art

"Buy low, sell high" has been the mantra of financial traders. In general, traders attempt to buy stocks at a low price then sell at a higher price. However, predicting the best time to buy or sell a stock is difficult. It has been recognized that stocks at times follow a momentum life cycle as shown in FIG. 2 (as documented by Charles M. C. Lee and Bhaskaran Swaminathan, "Price Momentum and Trading Volume", *Working Paper*, Johnson Graduate School of Management—Cornell University, Jun. 23, 1998). The approach shown in FIG. 2 shows how trading of stock over time will shift from high-volume to low-volume and back again against winning and losing (increasing or decreasing stock price).

The momentum life cycle (MLC) hypothesis for price momentum, reversal and trading volume suggests that stocks and portfolios go through periods of investor favoritism and neglect. A stock or portfolio with positive price momentum (prior winners) would be on the left half of the MLC, while a stock or portfolio with a negative price momentum (prior losers) would be on the right half of the MLC.

Growth stocks with positive momentum move up the MLC but eventually become "torpedoes." Stocks that have negative momentum begin a downward slide and then may experience neglect. The price may continue to fall until investors become interested again.

Trading volume and turnover provide information useful in determining where the stock is in its MLC. When a stock becomes popular, trading volume increases. Conversely, when a stock becomes unpopular, trading volume declines. Accordingly, trading volume is a measure of the favoritism or neglect of a stock. The MLC shows that high-volume winners and low-volume losers are late-stage momentum stocks that may be close to a reversal. Alternatively, low-volume winners and high-volume losers are early-stage momentum stocks whose momentum is likely to continue in a winning direction and losing direction, respectively.

However, this conventional approach does not readily predict where a given stock is on the momentum life cycle, nor does it provide ready selection of a portfolio of stocks during which an investor may exploit the momentum life cycle.

SUMMARY

The present invention relates to methods for analyzing and predicting where stocks are on the momentum life cycle by using a volume/turnover filter to select a portfolio of stocks. The resulting portfolio includes both low-volume "winners" and high-volume "losers".

The present invention starts with a set of stocks, for example, the stocks comprising the S&P 500. The stocks are divided into deciles based on net price performance over the past year. The top decile performers are referred to as "winners," and the bottom decile performers are referred to as "losers." The selection of the time interval over which the stocks are evaluated may be changed to include or exclude various market corrections, including, for example market changes or investment horizon changes.

It is appreciated that any collection of stocks may be used, including, but not limited to, large cap stocks, small cap stocks, stocks of a mutual fund, stocks of a combination of mutual funds, stocks comprising the FTSE Europe, the Dow Jones Industrial average, and other collections of stocks as are known in the art. The present invention may also be applied to the Russell 1000 index and Russell 3000 index in the US and Euro STOXX index in Europe. Further, it may be applied to the S&P 500, MSCI Europe, and the Japanese TOPIX.

It is also appreciated that the stocks may be separated into any grouping including fifths, fourths, twentieths, and the like, as opposed to using deciles.

One advantage of increasing the number of grouping of stocks is that the investor has more diversification. The combined momentum and volume turnover filter may be applied to additional stocks in the middle deciles (in a decile-based grouping) not just to the winners and losers.

Next, a volume/turnover filter is applied to the resulting groupings of winners and losers. The volume/turnover filter determines the volume traded of each stock and compares this volume to the price of the stock over time. The stocks for each of the winners and losers are ranked in order of the change in trade volume over time. By comparing each stock against itself, the volume/turnover filter becomes volume neutral. Each of the winners and losers are split into two groups: high-volume winners and low-volume winners and high-volume losers and low-volume losers. The low-volume winners and the high-volume losers are selected from this resultant groupings. A trader may then invest long in the low-volume winners and short in the high-volume losers over a predefined holding period (for example, three to six months). Other holding periods may be selected based on market conditions. Further, the filter may be a multi-part filter in which a first group of stocks is eliminated during a first round of processing and a second group is eliminated during a second round of processing.

Using one-year price momentum, three to six months is one embodiment's holding period and is supported by research.

The portfolio resulting from using the above process is equal-dollar weighted and market-value neutral at the beginning of each holding period. However, hedge funds and enhanced index fund managers may have alternative methods of applying the present invention.

As to additional strategies, for hedge and index funds, one may go long the winners only or go short the losers only. In addition, one can go long the winners and short the S&P 500, or one may go short the losers and long the S&P 500.

These and other aspects of the invention will be apparent from the following drawings and description.

BRIEF DESCRIPTION OF DRAWINGS

FIGS. 3-50 are comparisons of the performance of portfolios created by present invention against other portfolios and/or benchmarks.

DETAILED DESCRIPTION

The present invention relates to systems and methods for analyzing and predicting the course of stocks over time. The present invention applies a volume/turnover filter to a momentum life cycle analysis system. The resulting aggregate of stocks falls into two groups, including low-volume winners and high-volume losers. A trader may then make trading decisions based on the collections of stocks.

The present invention may be implemented in a stand-alone computer with information regarding various issues. The computer preferably has a processor and various input and output means including displays, diskette drives, CD-ROM drives, parallel, and network ports. Alternatively, the present invention may receive information from a remote database having current market information. Providers of this information include BARRA, Inc., Reuters Limited, Bloomberg L. P., and others. Further, the present invention may be implemented over the Internet and other known networks. The invention may further be stored on a computer-readable medium as a series of steps. The results of the application of the present invention may be stored locally in a portfolio, may be stored on a remote system (for example, with a brokerage house), or may be stored with another storage system that later farms out trades to create a desired portfolio (for example, Yahoo! or MSN).

Figure 1:
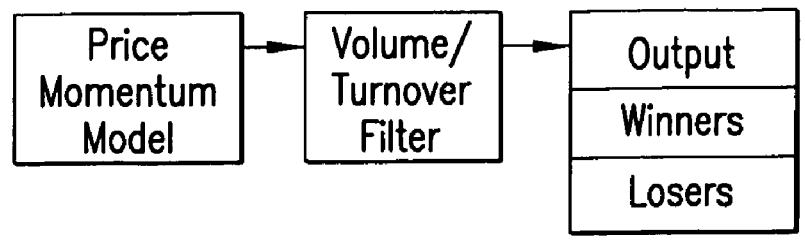
FIG. 1 is a process for determining winners and losers in accordance with embodiments of the present invention.
Figure 2:
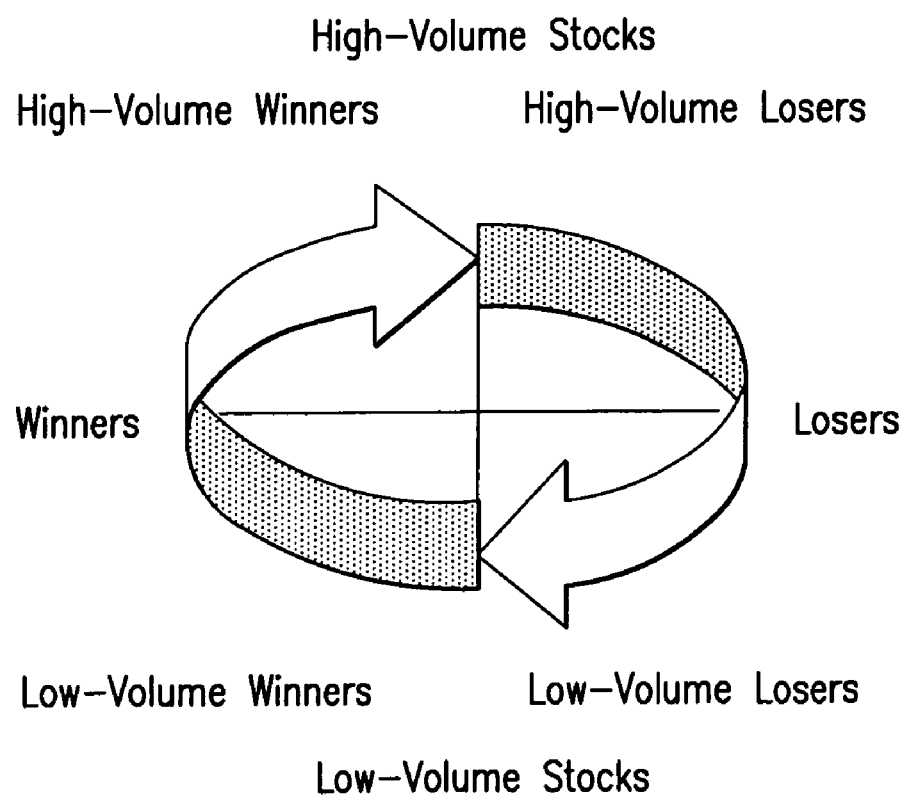
FIG. 2 is a conventional stock life cycle.

FIG. 1 shows a process for determining low-volume winners and high-volume losers. First, stocks from a grouping of stocks are separated into winners and losers using the momentum life cycle of FIG. 2. For example, the lowest ranked decile of the past 12 months of price performance is labeled the "losers" portfolio and the highest ranked decile of the past 12 months of price performance is labeled the "winners" portfolio. In one implementation, a one-year price momentum is a good measurement period for a three- and six-month holding period. See the Equity Derivative Research Report, "Winners Will be Winners, Losers Will Be Losers: A Tale of Relative Momentum," Jan. 13, 1999 by the inventors.

Next, a volume/turnover filter is applied to the winners and losers. The output of the volume turnover filter includes low-volume winners and high-volume losers. A trader may then invest long in the low-volume winners and short in the high-volume losers. The present invention maybe recalibrated periodically or after a market adjustment or correction.

The volume/turnover filter on the one-year price momentum of stocks divides the price momentum decile (or whichever grouping is selected) in half for both the winners and losers. This may be referred to as the Enhanced Momentum (EM) process for determining high-volume losers and low-volume winners. For the S&P 500 index and using a decile stock grouping, the volume/turnover filter outputs 25 winners and 25 losers. The portfolio using this strategy is equal-dollar weighted and market-value neutral by being long the winners and short the losers at the beginning of each holding period. However, hedge funds and enhanced index fund managers may have alternative methods of applying the present invention.

The volume turnover filter divides average daily volume into four to five previous quarters (5Q to 1Q or 4Q to 1Q). Turnover is described as the average daily volume in shares (split adjusted) divided by the total number of shares outstanding (split adjusted) which is used but can be described as the average daily dollar volume divided by the market capitalization of the stock. Next, the average turnover (volume) over each individual quarter is used to create five separate points. The change from the average turnover (volume) representing 5Q to 4Q, 4Q to 3Q, 3Q to 2Q and 2Q to 1Q is summed. If this sum is positive, then the turnover is increasing (high) volume and if this sum is negative, then the turnover is decreasing (low) volume. Alternatively, in another embodiment, one can use a regression to determine the slope of the volume or turnover.

To analyze the results, the portfolios are constructed at the end of each quarter and half-year rebalancing period using the historical constituents of the S&P 500 (or the associated index). Next, one compares a three-month and six-month holding period for each rebalanced portfolio. It was determined that that three-month and six-month holding periods appeared to be a good investment horizon using one-year price momentum. In fact, as the holding period increases to 12 months, reversal of momentum-based performance may occur in certain quarters. In addition, any positive returns are not reinvested into and any negative returns are not removed from the portfolio that is rebalanced. Next, the returns of the long winners and short losers portfolios of the EM process and the long S&P 500 portfolio over each holding period were measured with the same starting notional amounts after each quarterly or half-year rebalance. In this example, the starting value of each portfolio and the respective S&P 500 index were normalized on the portfolio formation date. For these analyses, the yearly returns in the following figures are expressed as the sum of the quarterly or half-year normalized returns (simple returns).

The investments in the winners may be for the same time period as for that of the losers. Alternatively, the times may be different. For example, the investment period for the low-volume winners may be six months, and the investment period for the high-volume losers may be three months. It is appreciated that these holding periods are adjustable for an investor's desired level of risk and market behaviors. For example, in a highly volatile market, an investor may desire to shift the holding periods from six and three months to three months and six weeks, respectively.

One-year is optimal for a three to six-month holding period, but if one uses less than a one-year price momentum and/or a volume/turnover measurement period, then the investment horizon period may change depending on the investor's investment horizon.

The present invention is described with respect to the S&P 500. It is appreciated that other markets and other stocks may also be used, including markets and stocks from the NAS-DAQ, NYSE, FTSE Europe, the MSCI (Morgan Stanley Capital International, Inc.) Europe, the MSCI World basket, the TOPIX of Japan, and the like. The stocks may be chosen on a number of bases including volatility, market capitalization, diversity, and the like. For example, one may select stocks from the S&P 100. Further, the present invention may be applied to holdings of mutual funds as well as become the basis for a mutual fund or funds. These and other markets and applications are shown in the following publications, which are incorporated by reference:

1. Winners Will Be Winners, Losers Will Be Losers: A Tale of Relative Momentum. Jan. 13, 1999;
2. The New "Winners" and "Losers" of the S&P 500 Using Turnover and the "Momentum Life Cycle" Hypothesis. Nov. 12, 1999;
3. The "Winners" and "Losers" Strategy in Europe. Dec. 10, 1999;
4. The "Winners" and "Losers" Strategy: An Alpha Strategy that is also a Defensive Strategy During Market Declines. Dec. 23, 1999;
5. December List of "Winners" and "Losers" Strategy For the US (S&P 500). Dec. 23, 1999;
6. Product Focus: Products for the "Winners" and "Losers" Strategy for the S&P 500. Dec. 23, 1999;
7. A Momentum Strategy for All Seasons. Jan. 7, 2000;
8. The Lehman Momentum Model: A Decade of Great Returns and Low Risk. Feb. 18, 2000;
9. Enhanced Index Strategy for the S&P 500 Using The "Winners" of the Lehman Enhanced Momentum (LEM) Model. Mar. 17, 2000;
10. The May List of "Winners" and "Losers" Using the Lehman Enhanced Momentum (LEM) Model For the S&P 500 and For the FTSE Europe. May 12, 2000;
11. The Lehman Enhanced Momentum (LEM) Model "Winners" and "Losers" After the Market Turmoil. Apr. 14, 2000;
12. The June List of Winners and Losers Using the Lehman Enhanced Momentum (LEM) Model For the S&P 500. Jul. 7, 2000;
13. The Lehman Enhancement Momentum Model For the Japanese Market. Aug. 21, 2000;
14. The Lehman Enhancement Momentum Model For the MSCI Europe. Sep. 5, 2000; and
15. Update of Global Lehman Enhanced Momentum (LEM) Model. Sep. 18, 2000.
16. Update of Global Lehman Enhanced Momentum (LEM) Model. Oct. 16, 2000.

One of the preferred modes of operating the present invention includes the Lehman Enhanced Momentum Model, as used by Lehman Brothers.

Further, the present invention may be enhanced by accommodating seasonal trends for quarterly and half-year holding periods and adjusting for historical weights of the portfolios for each of the eleven S&P 500 sectors. The present invention may be used as part of an alpha strategy or as part of a defensive strategy during market corrections (for example, during the market corrections of August 1998, October 1997 and January 2000). Finally, the present invention may be part of a strategy for both hedge funds and enhanced index fund managers.

Among the winners (losers), low-volume (high-volume) stocks show a greater persistence in price momentum. In addition, low-volume (high-volume) firms exhibit characteristics associated with value ("glamour") stocks at different stages in the MLC. As a stock moves up the MLC, trading volume increases. In addition, the stock may become expensive using a price-to-value measure, thus setting up the stock for erosion in price performance due to a non-fulfillment of inflated expectations (the "torpedo effect").

The MLC hypothesis for price momentum, reversal and trading volume suggests that stocks and portfolios go through periods of investor favoritism and neglect. If aggregate supply of stock is fixed, investors can receive a different quality of buy and sell signals for stocks. Volume provides information on the quality of the signal that is different than price data because volume is not normally distributed. The role of volume as a signal or precision of beliefs means that volume statistics provide information to the market that is not conveyed in price. Most technical indicators are statistical deviations calculated from price data. Since volume indicators are totally independent of price data, volume indicators offer a more objective view of the quality of the price trend. This independence of the volume data is what allows the quality of information to be inferred from price dependent market statistics. Volume in the form of turnover can then be used to interpret the quality of information to determine the stage in the MLC of the stock or portfolio. Therefore, trading volume provides quality information on the favoritism or neglect of a stock that allows for the portfolio selection of winners and losers.

One may use the process of FIG. 1 to choose a better portfolio with fewer stocks and higher average returns using a volume/turnover filter as applied to a basic one-year price momentum process.

Referred to herein as the enhanced momentum (EM) process, the invention helps a trader determine a long portfolio of "winners" and a short portfolio of "losers." The resulting portfolios created by the present invention were tested over the period from 1990 through 1999 using the historical constituents of the S&P 500 for both quarterly and half-year holding periods.

Regardless of the date of the rebalance, the long winners and short losers strategy using the EM process does well historically over a full year on average and over the aggregate for both a quarterly and half-year rebalancing frequency.

Over the last 10 years (1990-1999), the long winners and short losers strategy using the EM process outperformed the long/short strategy of a basic one-year price momentum process by 304 basis points (123 basis points) per year, on average, for a quarterly (half-year) rebalancing frequency. In addition, the EM process creates higher returns over the aggregate than a one-year price momentum process from 1990 to 1999.

The winners of the EM process for the S&P 500 outperformed the comparable index returns of the S&P 500 by 10.1% (9.2%) per year, on average, for quarterly (half-year) holding periods over the last 10 years. This strategy worked especially well after the month-end rebalance in the summer months of May, June and July on average and over the aggregate.

In general, it was found that the distribution of the returns from the strategy for each year over the last 10 years shows that the EM long/short strategy works well and that the yearly returns of the winners outperform the returns of the S&P 500 index from 1990 to 1999.

The winners of the EM process have shown an increase in the number of stocks in the technology sector and a decrease in number of stocks in the consumer cyclical sector over the 1990 decade. The losers of the EM process have shown an increase number of stocks in the consumer cyclical and capital goods sectors and a recent decrease in the number of stocks in the technology sector over the 1990 decade.

Seasonal trends are exhibited in the strategy for the losers of the S&P 500 for the month-end rebalance in January, February and March when the losers perform extremely well. This may be a reflection of the rebound of some losers from tax-loss-related selling that occurs at the end of the year, as well as the cyclical nature of some stocks in the losers portfolio.

The long winners and short losers strategy using the EM process can be an alpha strategy or a defensive strategy during market declines. During the large market correction of August 1998, the long winners and short losers strategy of the EM process had positive returns on average compared to the losses incurred by the S&P 500 index regardless of when the portfolio was created over the previous three or six months.

Finally, applications of the process for both enhanced index fund managers that may not be able to short stock and hedge funds that may want to use it as an alpha or outperformance strategy are provided. For an enhanced index fund, an enhanced S&P 500 index from the winners of the EM process that outperforms a fixed S&P 500 index on a quarterly (half-year) basis by 107 basis points (97 basis points) per year, on average, over the last two years from 1998 to 1999, with an annualized tracking error of 49 basis points (44 basis points) was created. For hedge funds, the average returns for the EM process by using a long winners and short S&P 500 Futures strategy for a three- and six-month holding period after the month-end rebalances of January through March and September through December were realized.

Figures 3, 4:
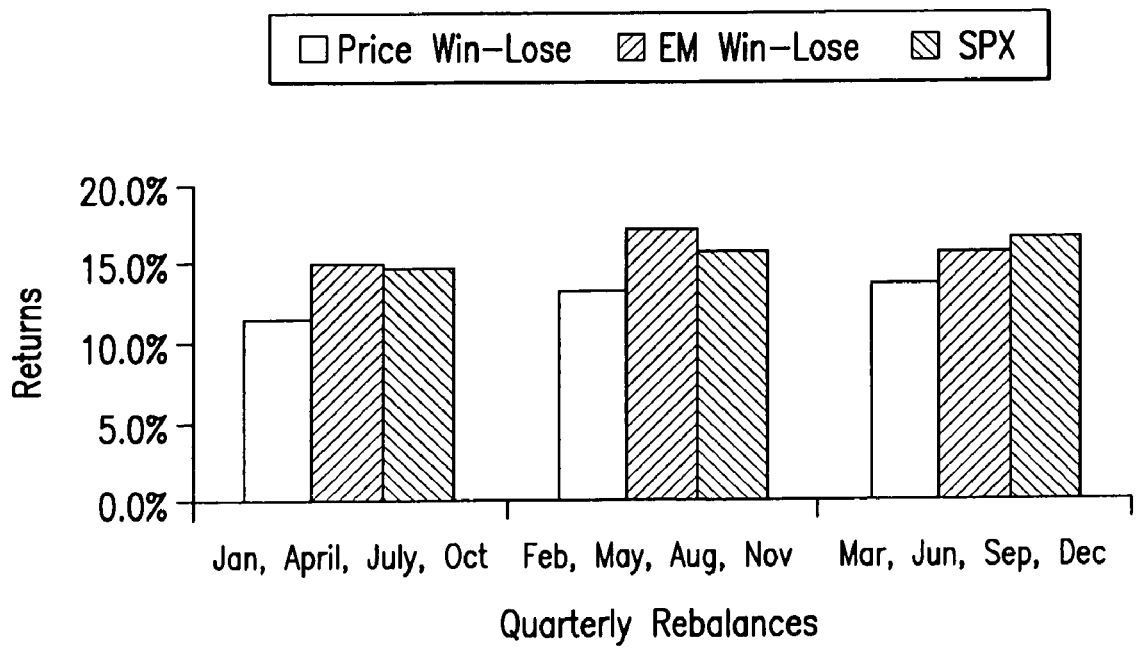
Figures 5, 6:
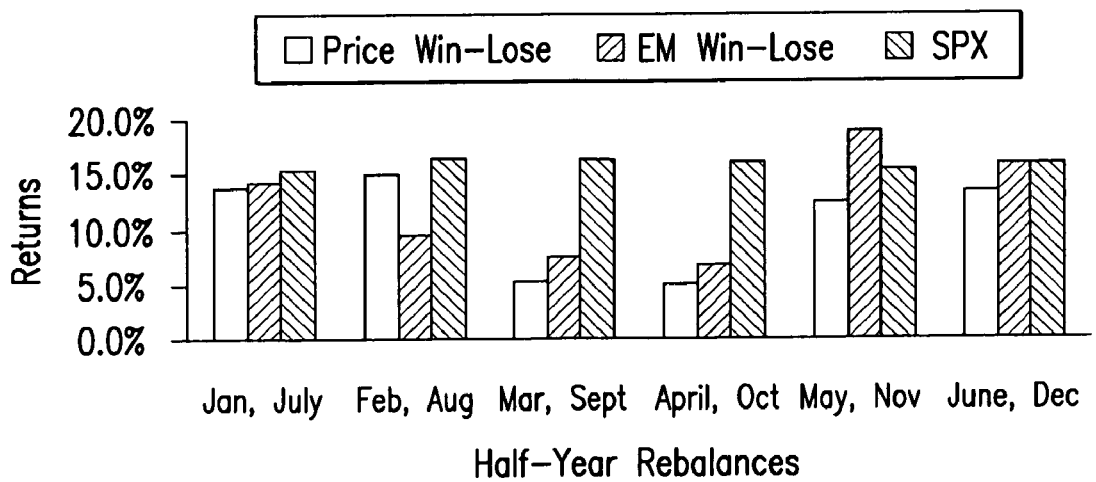

As shown in FIGS. 3 and 4, the long 25 winners and short 25 losers strategy using the EM process with the volume/turnover filter for the S&P 500 outperformed a long 50 Winners and short 50 losers of the basic One-Year Price Momentum Strategy per year, on average, over the last 10 years (from 1990 to 1999) for all possible combinations of quarterly holding periods. Similarly, as shown in FIGS. 5 and 6, the long winners and short losers strategy using the EM process generally outperforms a long/short Basic One-Year Price Momentum Strategy per year, on average, for all combinations of the half-year holding periods, except for the February/August half-year holding period. In addition, the winners of the EM process outperformed long winners of a Basic Price Momentum process of the S&P 500 index, on average, over each combination of three-month and six-month holding periods (except for the February/August six-month holding period). The February six-month holding period may exhibit the potential rally of some losers in the first half of the year which is explained below. One will note that after moving the calendar quarter or half-year rebalancing dates, the results are similar per year, on average, which is confirmed in the original analysis.

In two out of three of the quarterly combinations and two out of six of the half-year combinations, the long Winners and short losers Strategy of the EM process actually outperforms the overall returns of the S&P 500 index per year, on average. FIG. 3 (FIG. 5) shows that the returns for a three-month (six-month) holding period for the long winners and short losers strategy can be increased using the Volume/turnover filter of the EM process by 304 basis points (123 basis points) per year on average for all quarterly (half-year) combinations. In addition, the winners of EM process for the S&P 500 outperformed the comparable index returns of the S&P 500 by 10.1% (9.2%) per year for quarterly (half-year) holding periods on average over the last 10 years.

FIG. 3 shows the EM process versus the basic one-year price momentum process: yearly average of the simple sum of three-month holding period returns for the S&P 500 (1990-1999).

FIG. 4 shows the yearly average of the simple sum of three-month holding period returns of the long winners and short losers strategy for the basic one-year price momentum process and the EM process compared to the S&P 500 (1990-1999).

FIG. 5 shows the EM process versus the basic one-year price momentum process: yearly average of the simple sum of half-year holding period returns for the S&P 500 (1991-1999).

FIG. 6 shows the yearly average of the simple sum of six-month holding period returns of the long winners and short losers for the basic one-year price momentum process and the EM process compared to the S&P (1990-1999).

The long winners and short losers strategy over 1999 has been very successful relative to the S&P 500. FIG. 7 shows the quarterly and half-year portfolio selection of winners and losers for the Dec. 31, 1999 rebalance using the EM process. As of the Dec. 31, 1999 rebalance, the fourth quarter winners continue to be dominated by stocks in the Technology sector with a few stocks in the Basic Industry, Consumer Staple and Capital Goods sectors. The losers are dominated by stocks in the Consumer Cyclical, Consumer Staple and Healthcare sectors with a few stocks in the Financial sector.

FIG. 7 indicates whether a stock was selected in the previous quarterly portfolio. Approximately 50% or more of the winners, on average, remain the same for the next quarterly rebalance. However, less than 45%, on average, of the losers remain the same for the next quarterly rebalance indicating that there is more turnover in the portfolio of losers than the portfolio of winners for the S&P 500, on average. More stock turnover occurs with half-year rebalances than quarterly rebalances for both winners and losers. For a majority of the portfolios from 1990 to 1999, top decile winners generally had more stocks with decreasing volume or turnover and bottom decile losers had more stocks with increasing volume or turnover for both the three- and six-month rebalancing dates.

FIG. 7 shows selection of winners and losers of EM Process for the Dec. 31, 1999 Rebalance (Jan. 1, 2000 to Mar. 31, 2000 Holding Period).

As shown in FIGS. 8 and 10, the "winners" of the EM process have a higher Sharpe Ratio than the S&P 500 index for all combinations of the three- and six-month holding periods. This provides investors with an alpha stock process for winners with higher returns and lower risk than the S&P 500 index might offer. As shown in FIGS. 9 and 11, the market-neutral strategy of going long the winners and short the losers of the EM process provides higher returns than the three- or six-month LIBOR rate.

FIG. 8 shows the Sharpe ratio of the winners of EM process compared to S&P 500 for three-month holding periods (1990-1999).

FIG. 9 shows return comparison of the long winners and short losers of EM process for the S&P 500 compared to average U.S. dollar three-month LIBOR for three-month holding periods (1990-1999).

FIG. 10 shows the Sharpe ratio of the winners of EM process compared to S&P 500 for six-month holding periods (1990-1999).

FIG. 11 shows return comparisons of the long winners and short losers of EM process for the S&P 500 compared to average U.S. dollar six-month LIBOR for a six-month holding period (1990-1999).

Figure 12:
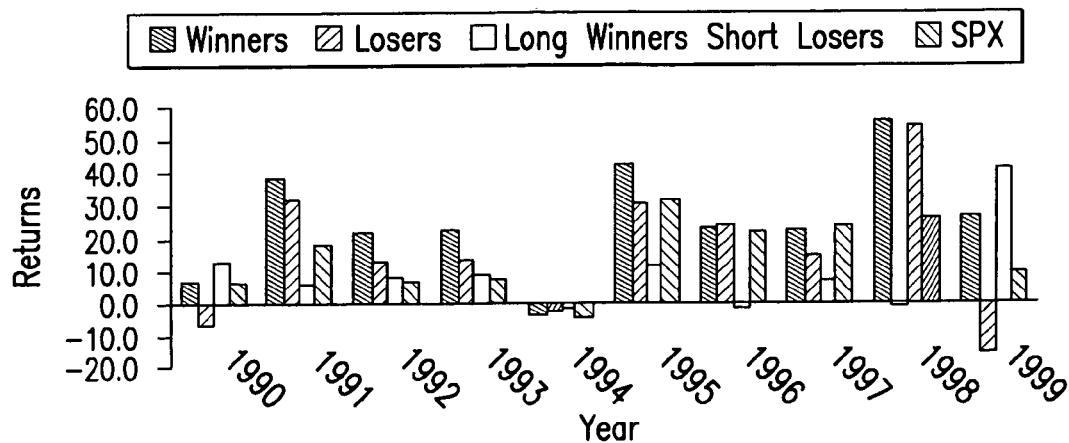

For distributions over the last 10 years, the largest gains have been achieved over the last two years (1998-99). However, as shown in FIG. 12, the winners of the EM process outperform the returns of the S&P 500 index, on average, in every year except in 1990 for the quarterly rebalance dates at the end of January, April, July and October. In addition, the long winners and short losers strategy outperforms the returns, on average, of the S&P 500 index in six out of 10 years, including 1990, 1992, 1993, 1994, 1998, and 1999. Excluding 1998 and 1999, the sum of the quarterly returns for each year is 6.6% per year, on average, for the EM long winners and short losers strategy without any re-investment, which still outperforms the annualized 5.43% LIBOR.

FIG. 12 shows the yearly returns of winners, losers and long winners/short losers of EM process compared to the yearly returns of the S&P 500 for the quarterly rebalances at the end of January, April, July and October (1990-1999).

Figure 13:
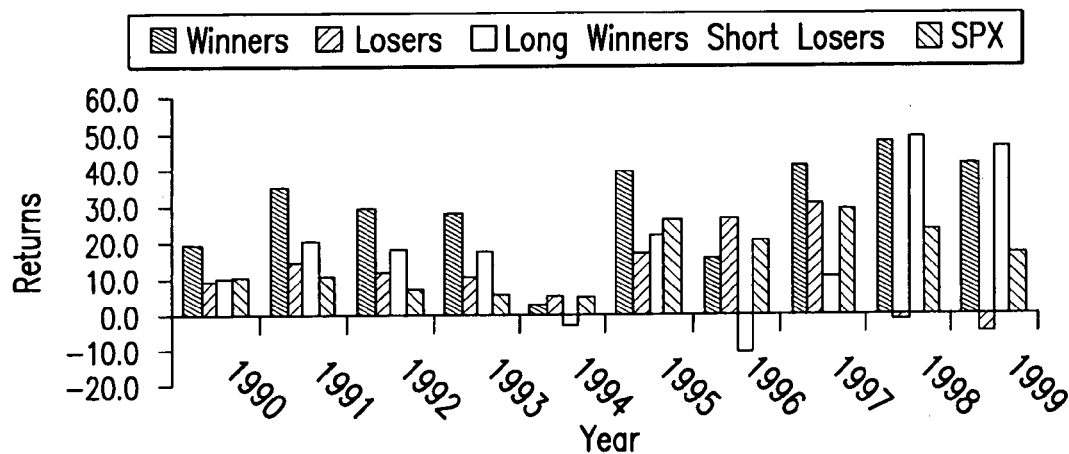

In addition, as shown in FIG. 13, the winners of the EM process outperform the returns of the S&P 500 index in every year except 1998 for the quarterly formation dates at the end of February, May, August and November. In addition, the long winners and short losers Strategy outperforms the returns of the S&P 500 index in six out of 10 years, including 1990, 1991, 1992, 1993, 1998, and 1999. Excluding 1998 and 1999, the sum of the quarterly returns for each year is 10.6% per year, on average, for the EM long winners and short losers Strategy without any reinvestment, which outperforms the annualized 5.45% LIBOR.

FIG. 13 shows the yearly returns of winners, losers and long winners/short losers of EM process compared to the yearly returns of the S&P 500 for the quarterly rebalance at the end of February, May, August and November (1990-1999).

Figure 14:
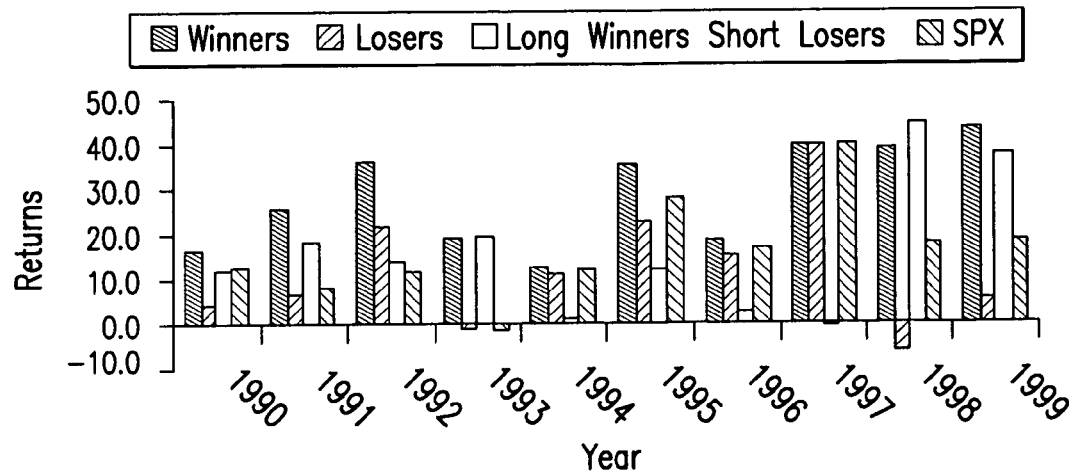

Furthermore, as shown in FIG. 14, the winners of the EM process outperform the returns of the S&P 500 index in every year for the quarterly formation dates at the end of March, June, September and December. In addition, the long winners and short losers strategy outperforms the returns of the S&P 500 index in five out of 10 years 1991, 1992, 1993, 1998, and 1999. Excluding 1998 and 1999, the sum of the quarterly returns for each year is 10.1% per year, on average, for the EM long winners and short losers Strategy without any reinvestment, which outperforms the annualized 5.43% LIBOR.

FIG. 14 shows the yearly returns of winners, losers and long winners/short losers of the EM process compared to the yearly returns of the S&P 500 for the quarterly rebalance at the end of March, June, September and December (1990-1999).

In general, as shown in FIG. 15 through FIG. 20, the winners of the EM process outperform the returns of the S&P 500 index for each half-year month-end rebalance date. One can see that the long winners and short losers strategy performs well in 1992, 1993, 1998 and 1999 over the different half-year combinations of rebalancing dates. Excluding 1998 and 1999, the sum of the half-year returns across all possible combinations of six-month holding periods is 6.47% per year, on average, for the EM long winners and short losers Strategy without any reinvestment, which still outperforms the average annualized 5.48% LIBOR across all possible six-month holding periods.

Figure 15:
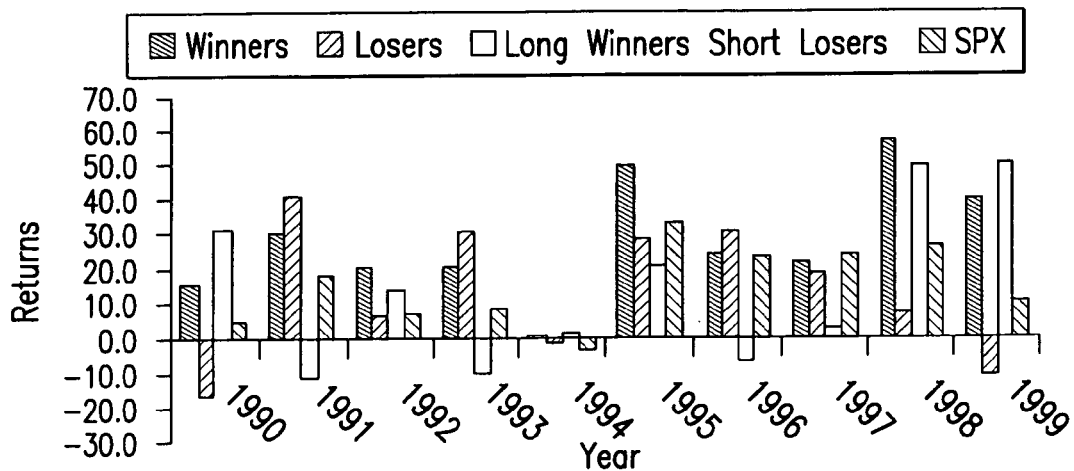

FIG. 15 shows the yearly returns of winners, losers and long winners/short losers of the EM process compared to the yearly returns of the S&P 500 for the half-year rebalance at the end of January and July (1990-1999).

Figure 16:
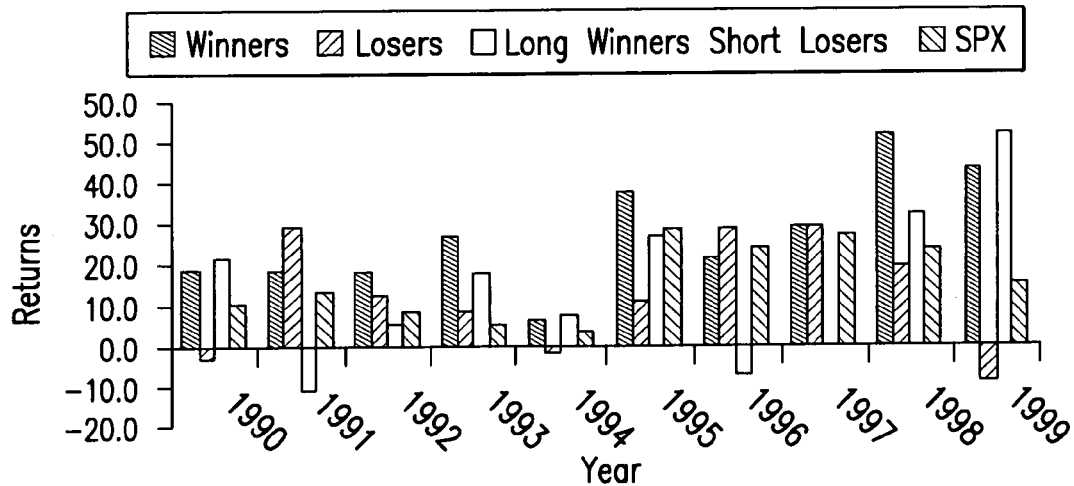

FIG. 16 shows the yearly returns of winners, losers and long winners/short losers of the EM process compared to the yearly returns of the S&P 500 for the half-year rebalance at the end of February and August (1990-1999).

Figure 17:
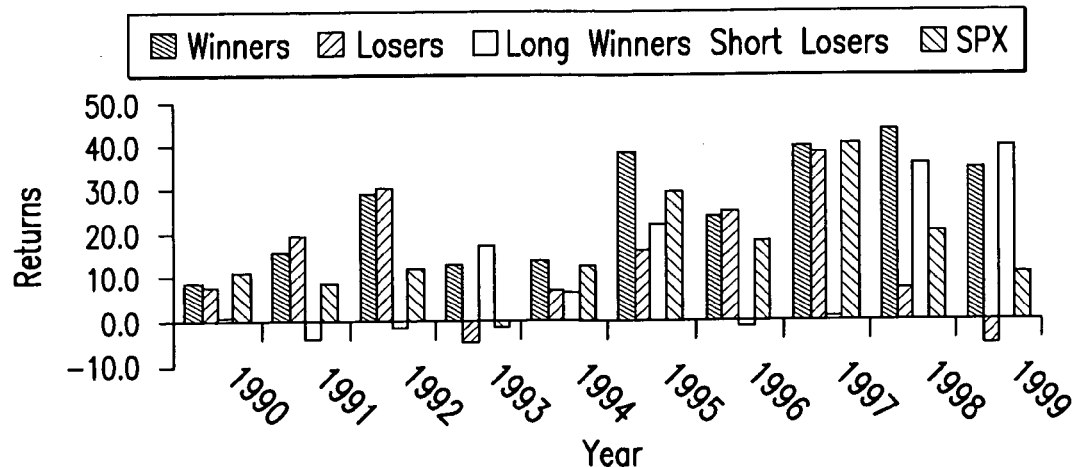

FIG. 17 shows the yearly returns of winners, losers and long winners/short losers of the EM process compared to the yearly returns of the S&P 500 for the half-year rebalance at the end of March and September (1990-1999).

Figure 18:
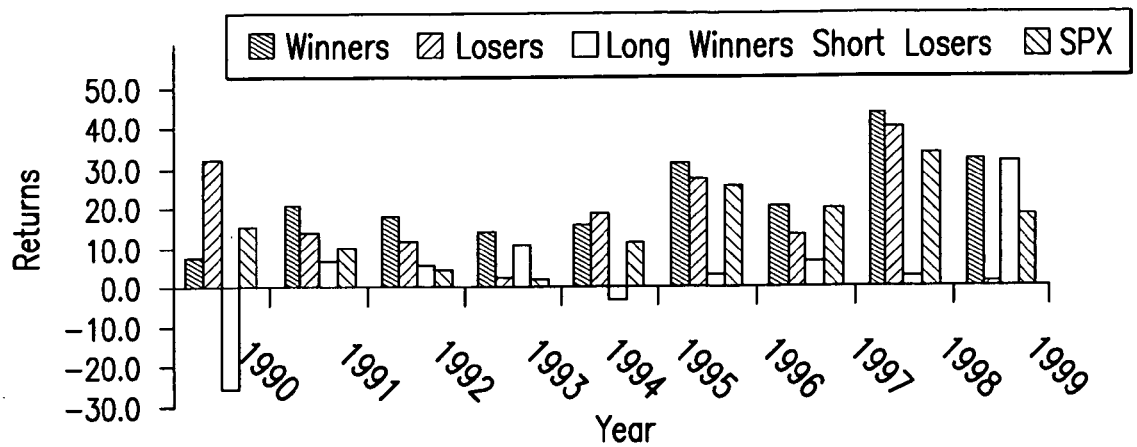

FIG. 18 shows the yearly returns of winners, losers and long winners/short losers of the EM process compared to the yearly returns of the S&P 500 for the half-year rebalance at the end of April and October (1990-1998).

Figure 19:
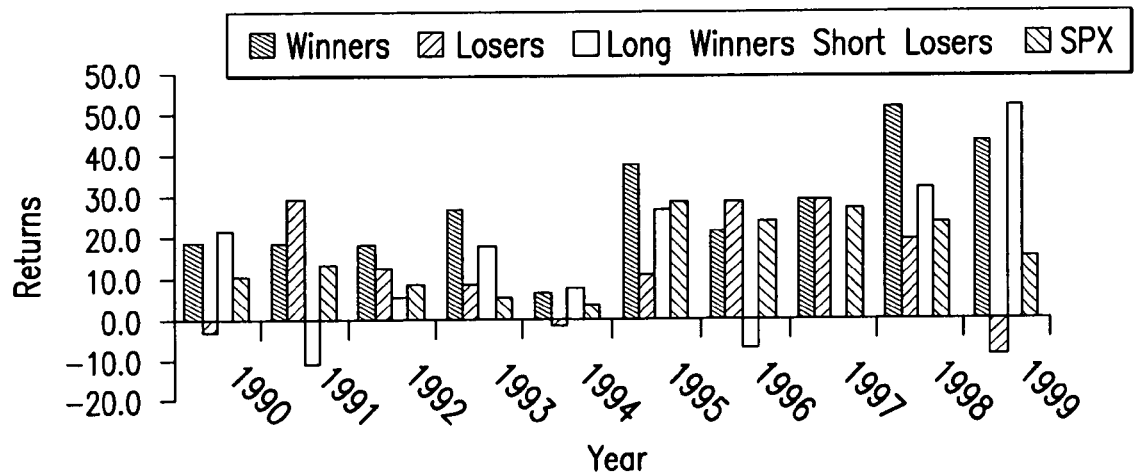

FIG. 19 shows the yearly returns of winners, losers and long winners/short losers of the EM process compared to the yearly returns of the S&P 500 for the half-year rebalance at the end of May and November (1990-1998).

Figure 20:
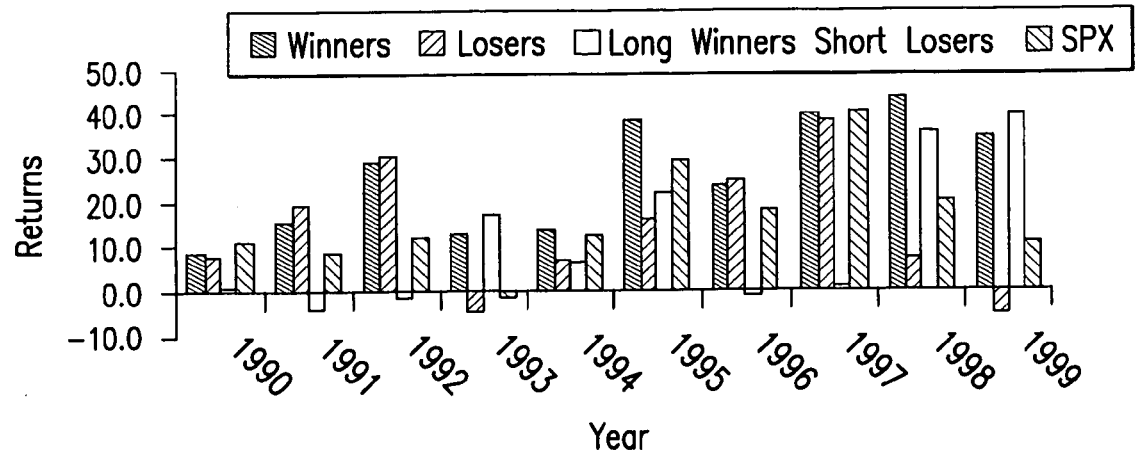

FIG. 20 shows the yearly returns of winners, losers and long winners/short losers of the EM process compared to the yearly returns of the S&P 500 for the half-year rebalance at the end of June and December (1990-1998).

Next, the seasonal performance of the EM process on average and over the aggregate from 1990 to 1999 was investigated. For each month-end formation date of the year, FIG. 21 (FIG. 22) shows the average returns of the strategy for the S&P 500 for a three-month (six-month) holding period from 1990 to 1999. The returns of the S&P 500 are also shown for comparison over the same time period. As shown in FIG. 21 (FIG. 22), the average return of the strategy varies but the strategy works well historically over a full year no matter when the month-end quarterly rebalance occurs for three-month (six-month) holding periods.

FIG. 21 shows the average return of a three-month holding period of the EM process for the S&P 500 (1990-1999).

FIG. 22 shows the average return of a six-month holding period of the EM process for the S&P 500 (1990-1999).

The performance of the winners portfolio of the EM process surpassing the losers portfolio in the summer months may be a result of the traditionally lackluster performance of the market (S&P 500). For the three-month holding period (FIGS. 23 and 25), losers outperform winners after the month-end rebalance in January and February. In addition, losers come close to matching the returns of the winners after the month-end rebalance in March for the three-month holding period. For the six-month holding period (FIGS. 24 and 26), losers outperform winners after the month-end rebalance in October and November. In addition, losers come close to matching the returns of the winners after the month-end rebalance in December for the six-month holding period.

Figure 23:
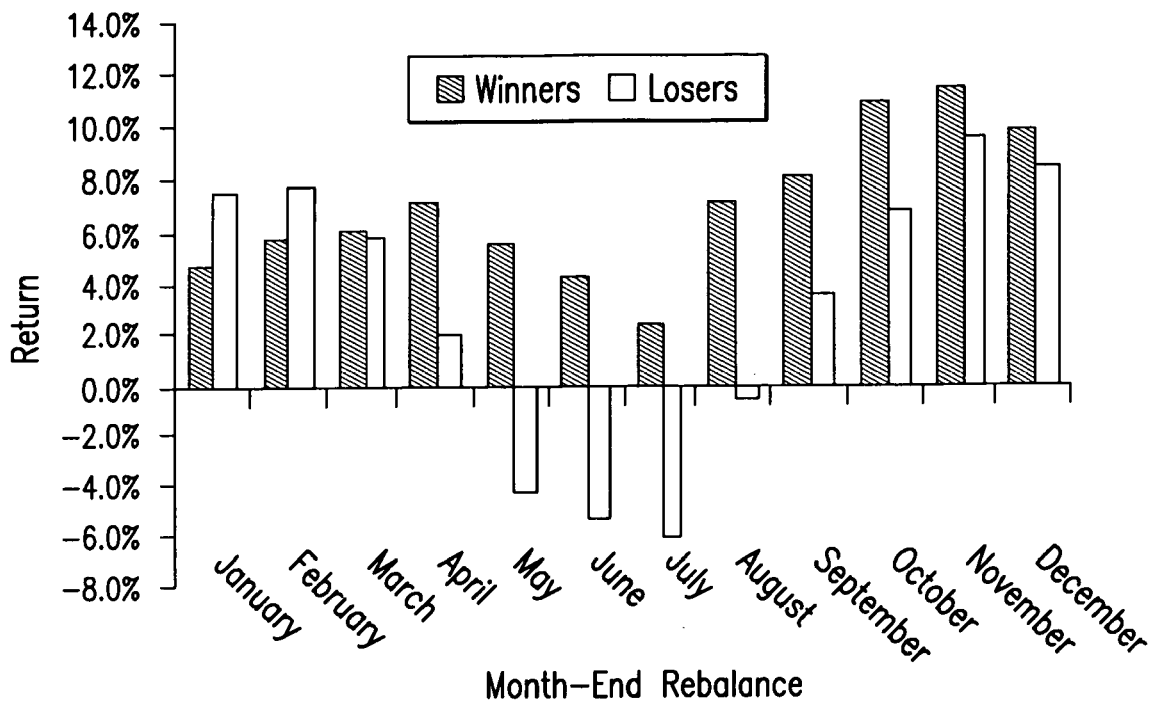

FIG. 23 shows the average returns of a three-month holding period for the winners and losers of the EM process after each month-end rebalance date (1990-1999).

Figure 24:
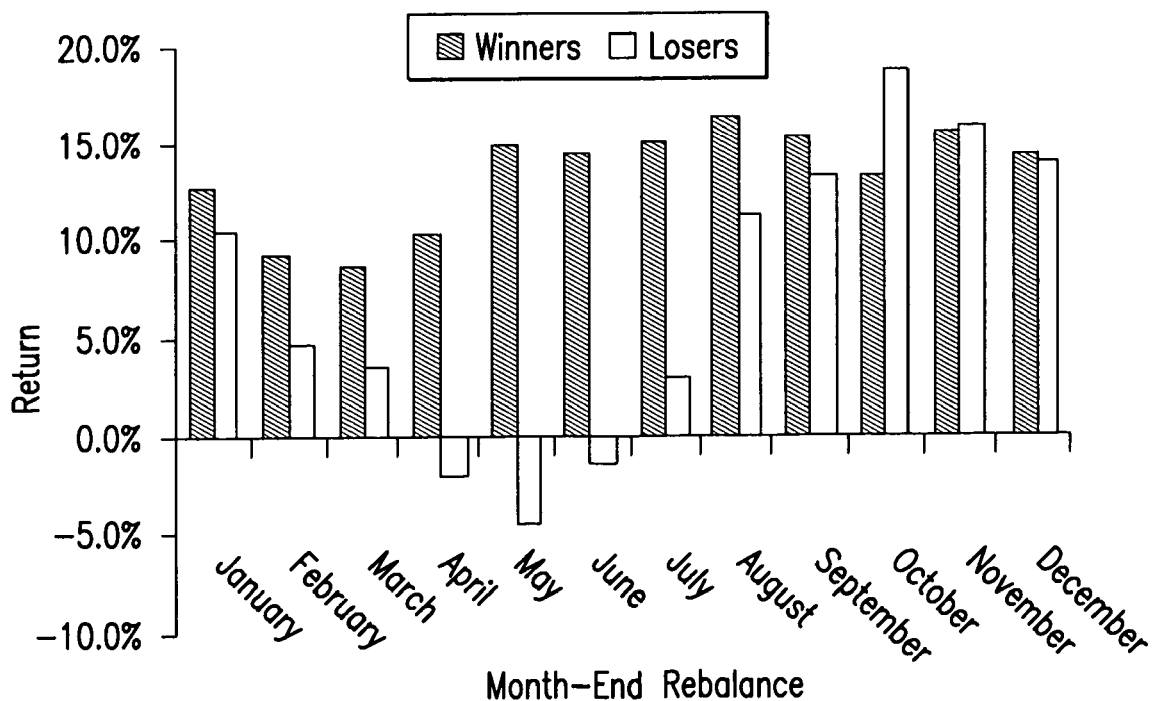

FIG. 24 shows the average returns of a six-month holding period for the winners and losers of the EM process after each month-end rebalance date (1990-1999).

The long winners and short losers Strategy of the EM process works best after the month-end rebalance of April through October (FIG. 25) for a three-month holding period and April through August (FIG. 26) for a six-month holding period. In some instances, the long winners and short losers strategy of the EM process worked especially well after the month-end rebalance in the summer months of April, may, June, July and August for the three- and six-month holding periods.

Figure 25:
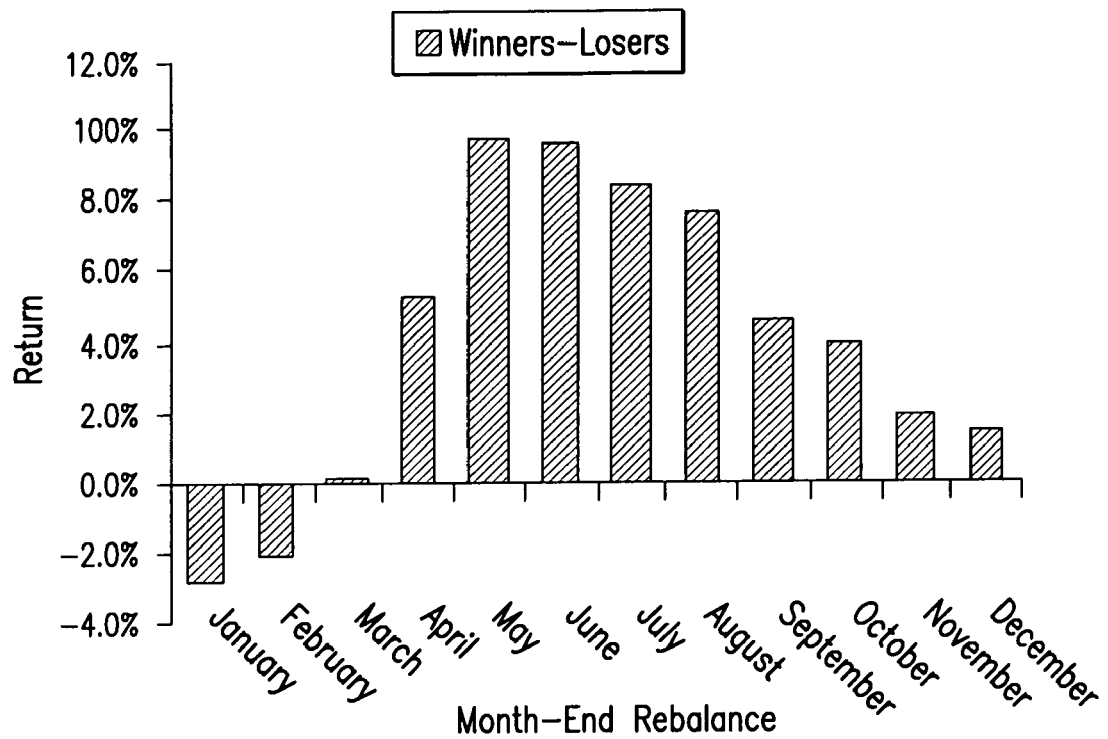

FIG. 25 shows the average returns of the winners and losers strategy of the EM process for a three-month holding Period after Each Month-End Rebalance Date (1990-1999).

Figure 26:
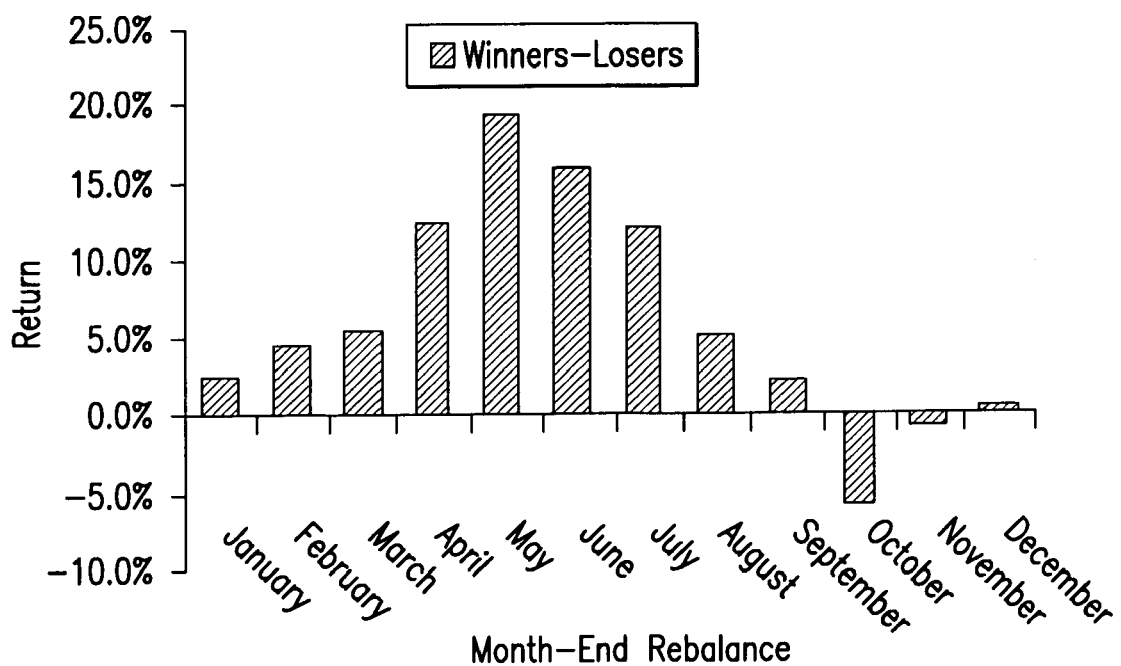

FIG. 26 shows the average returns of the winners and losers strategy of the EM process for a six-month holding period after each month-end rebalance date (1990-1999).

Figure 27:
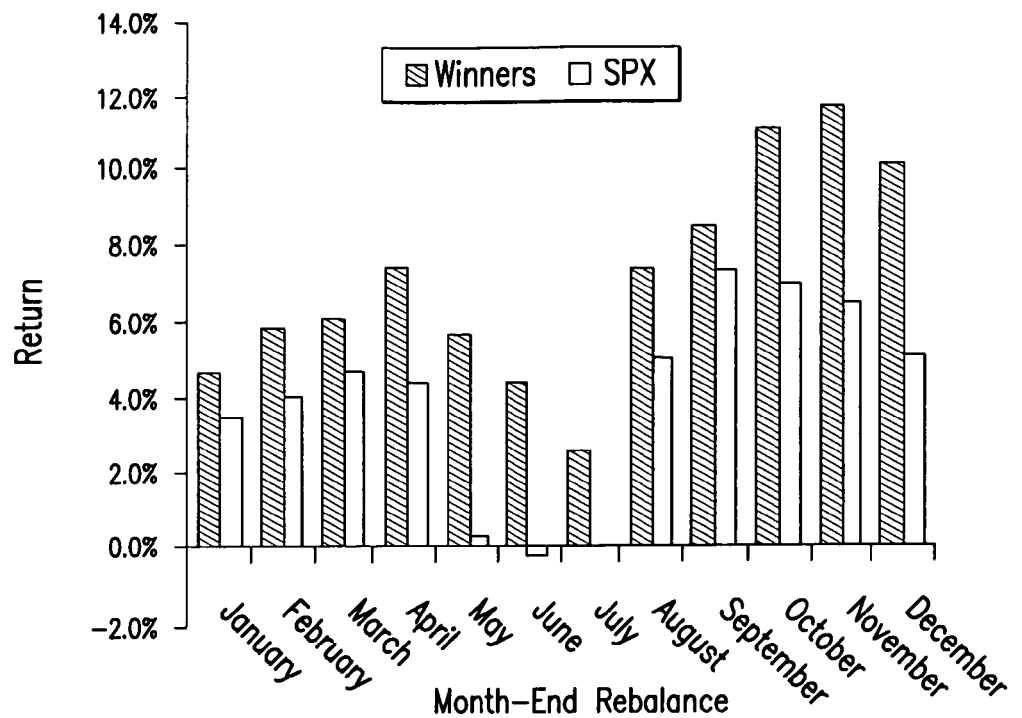
Figure 28:
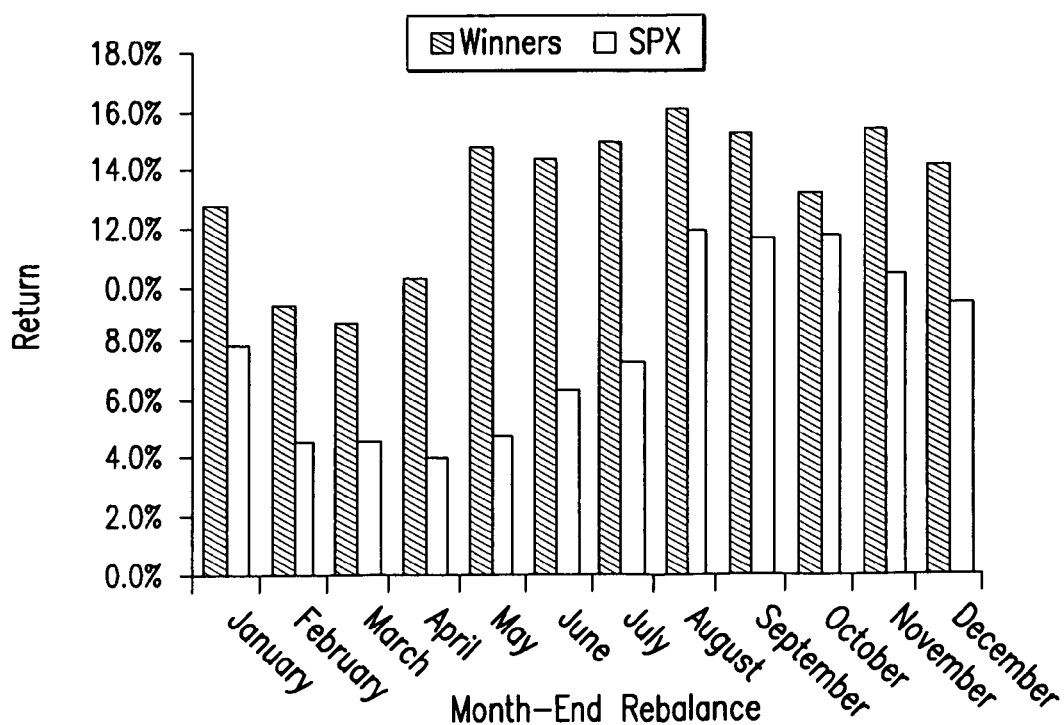

However, the returns of the winners of the EM process consistently outperform the returns of the S&P 500 index over a three-month holding period (FIG. 27) and performed especially well for the month-end rebalance of April, May, June and July for both the three- and six-month holding periods (FIG. 28).

The winners of the EM process for the S&P 500 outperformed the returns of the S&P 500 index on average in each three- and six-month holding period.

FIG. 27 shows the average returns of winners of the EM process vs. the average returns of the S&P 500 for a three-month holding period after each month-end rebalance date (1990-1999).

FIG. 28 shows the average returns of winners of the EM process vs. the average returns of the S&P 500 for a six-month holding period after each month-end rebalance date (1990-1999).

Figure 31:
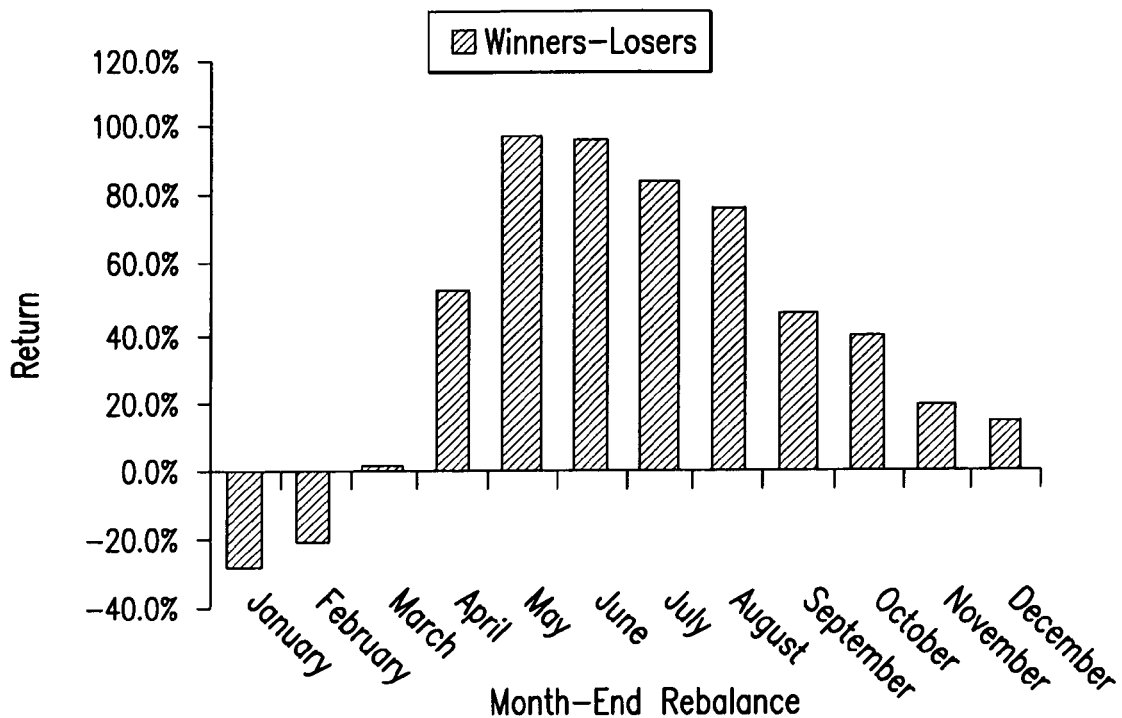

As the above disclosure shows, the EM process works well on average. It also works well over the aggregate from 1990 to 1999. Even aggregate returns show similar results as shown in FIG. 29 for the three-month holding period and FIG. 30 for the six-month holding period. The winners of the EM process outperform the returns of the S&P 500 index for each monthly rebalancing period for both the three and six-month holding periods over the aggregate of 10 years. As shown in FIG. 31 for three months and FIG. 32 for six months, the process performs especially well for the month-end rebalances of April, May, June, July, and August over the aggregate of 10 years. Again, the returns of the winners of the EM process consistently outperform the returns of the S&P 500 index over a three- and six-month holding period (FIG. 33 and FIG. 34 respectively) over the aggregate of 10 years.

FIG. 29 shows the aggregate returns of three-month holding period of the EM process for the S&P 500 (1990-1999).

FIG. 30 shows the aggregate returns of six-month holding period of the EM process for the S&P 500 (1990-1999).

FIG. 31 shows the aggregate returns of the winners and losers strategy of the EM process for a three-month holding period after each month-end rebalance date (1990-1999).

Figure 32:
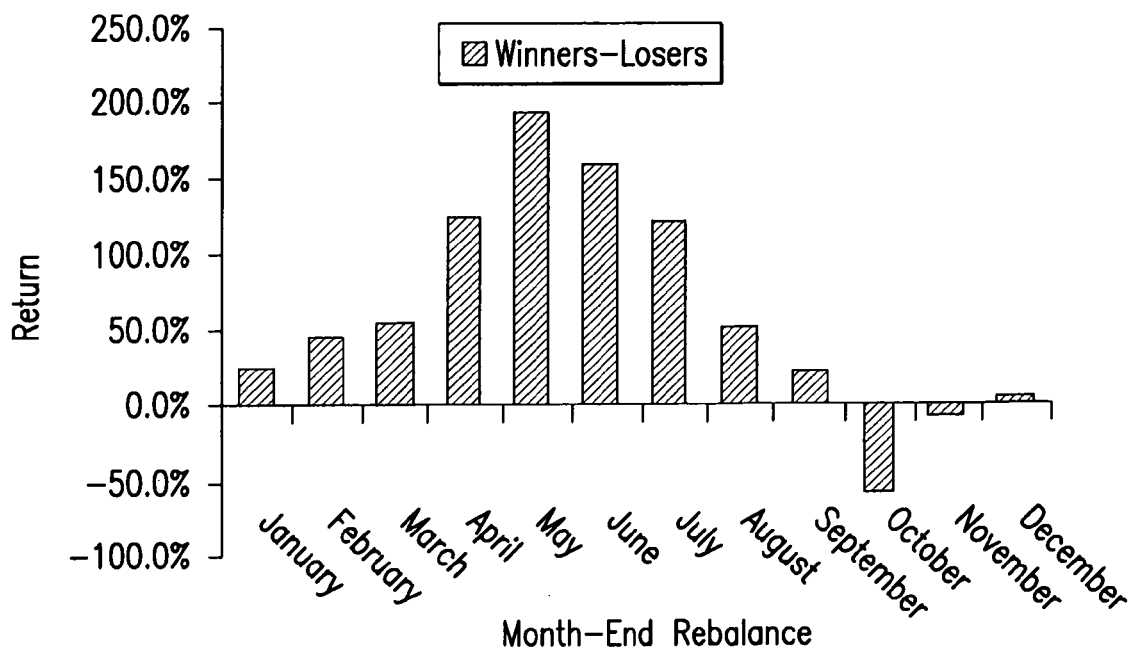

FIG. 32 shows the aggregate returns of the winners and losers strategy of the EM process for a six-month holding period after each month-end rebalance date (1990-1999).

Figure 33:
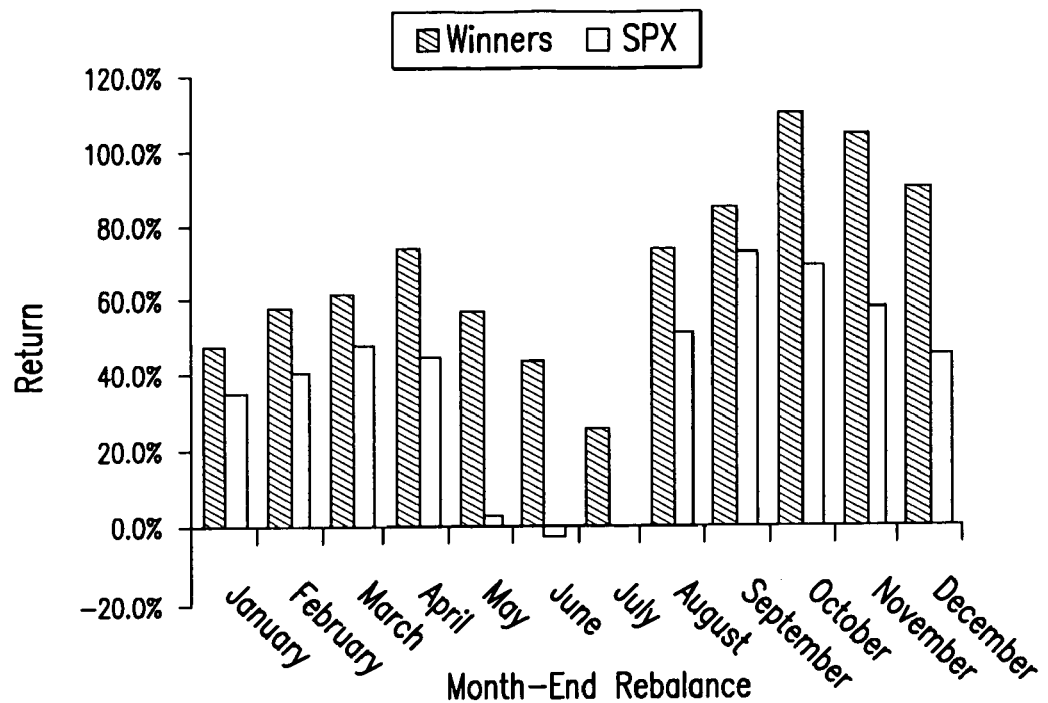

FIG. 33 shows the aggregate returns of winners of the EM process vs. the average returns of the S&P 500 for a three-month holding period after each month-end rebalance date (1990-1999).

Figure 34:
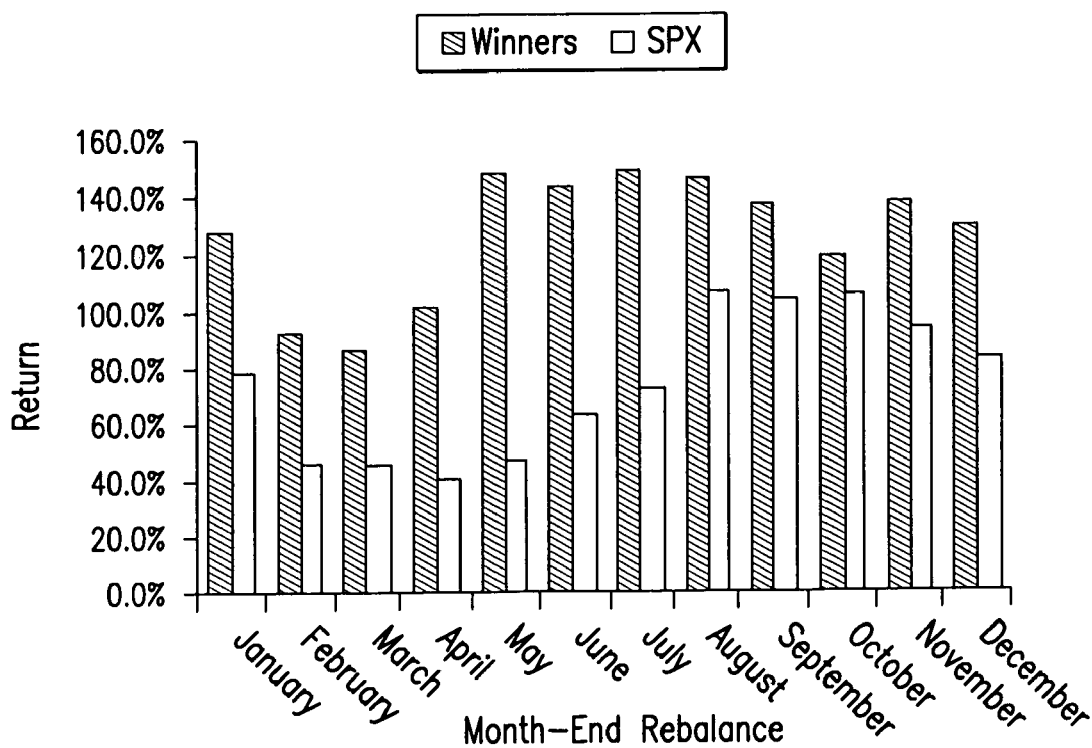
Figure 35A:
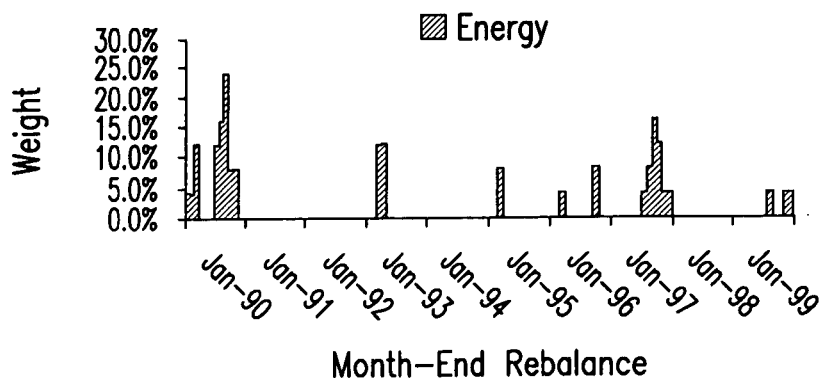
Figure 35B:
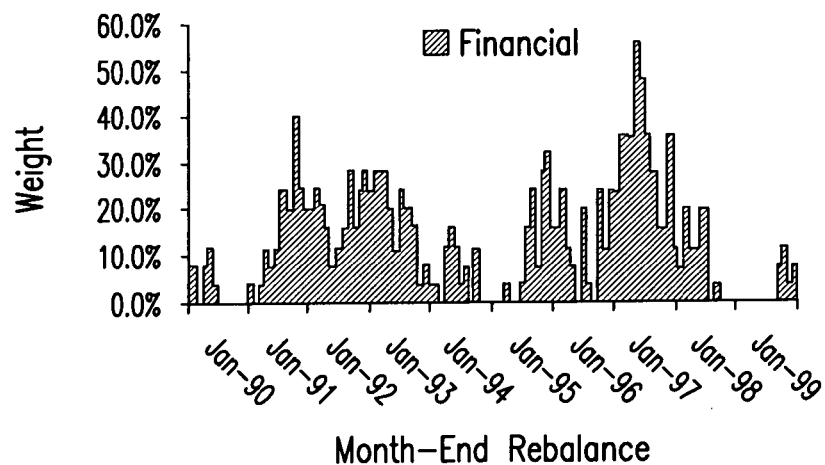
Figure 35C:
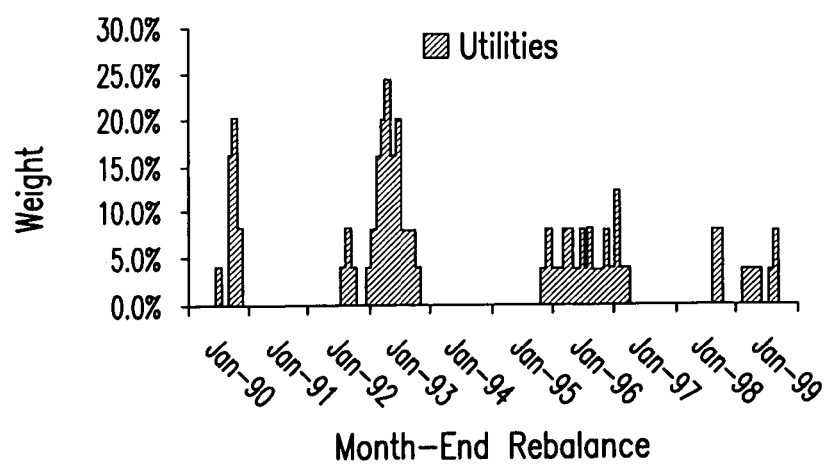
Figure 35D:
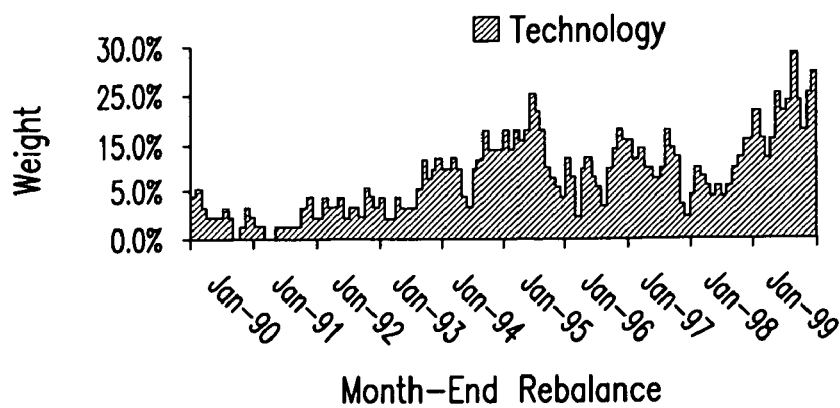
Figure 35E:
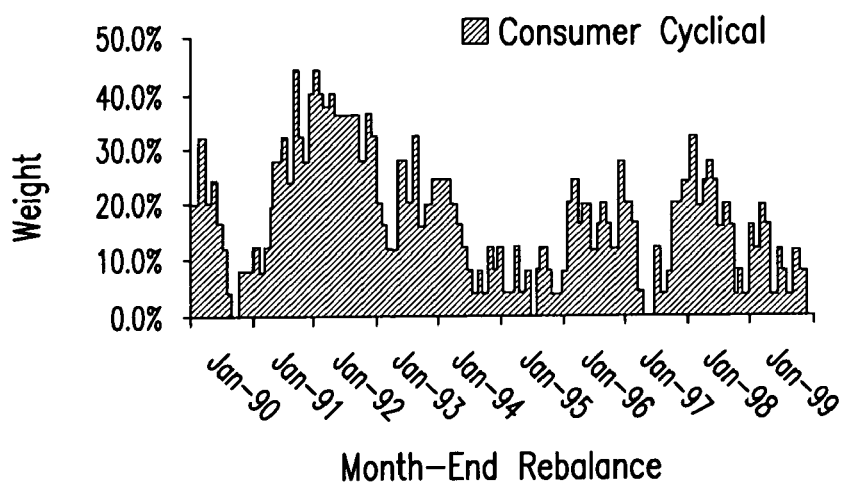
Figure 35F:
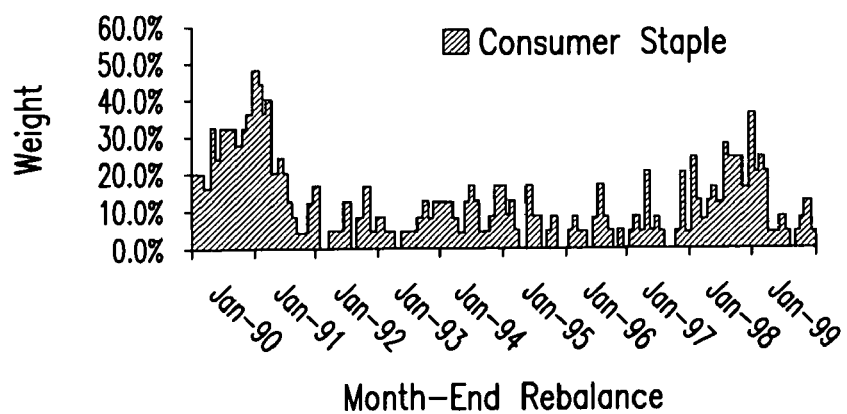
Figure 36A:
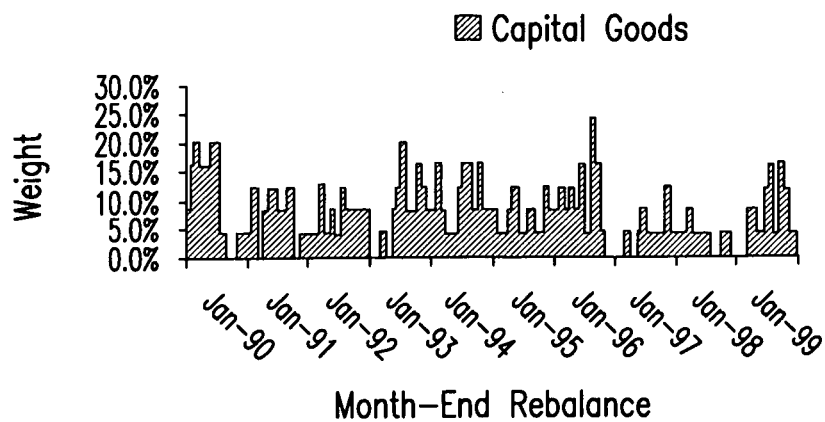
Figure 36B:
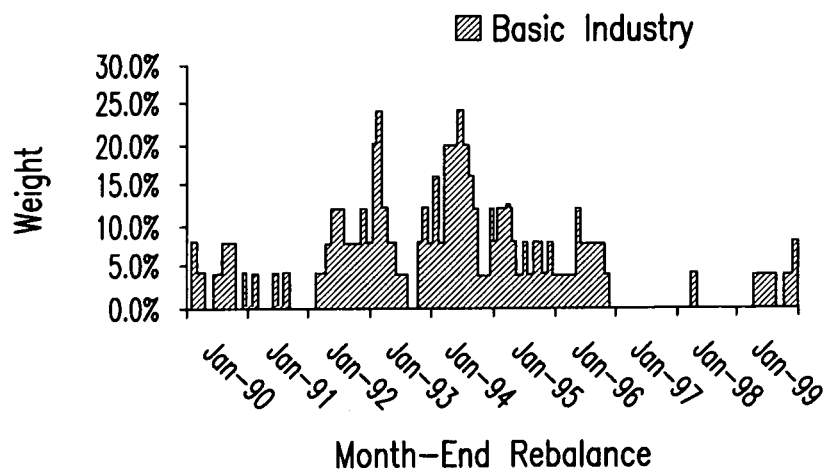
Figure 36C:
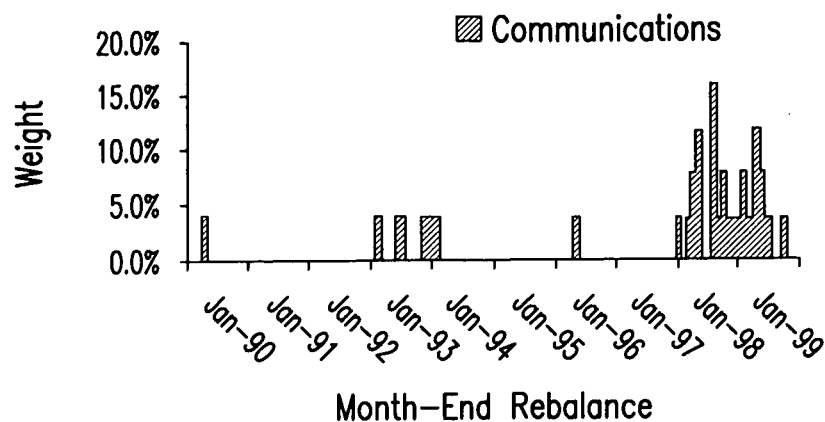
Figure 36D:
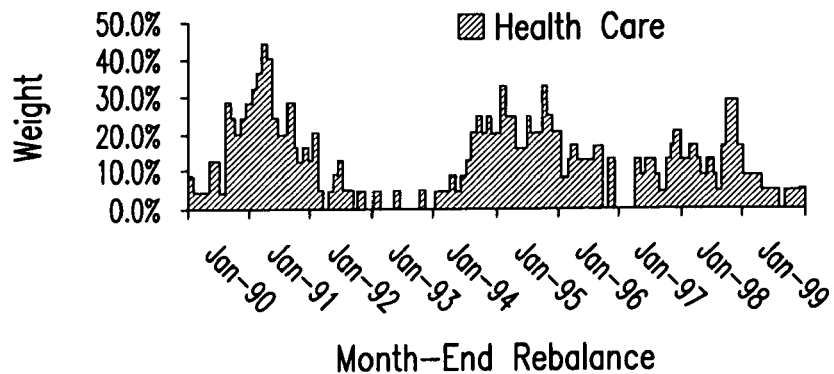
Figure 36E:
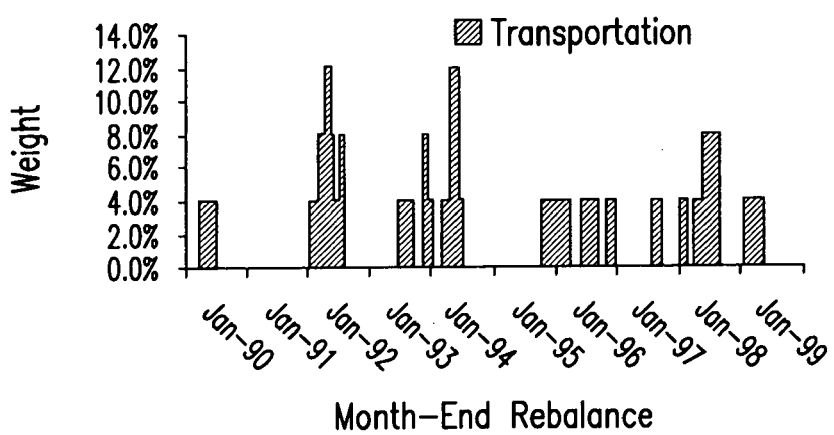
Figure 36F:
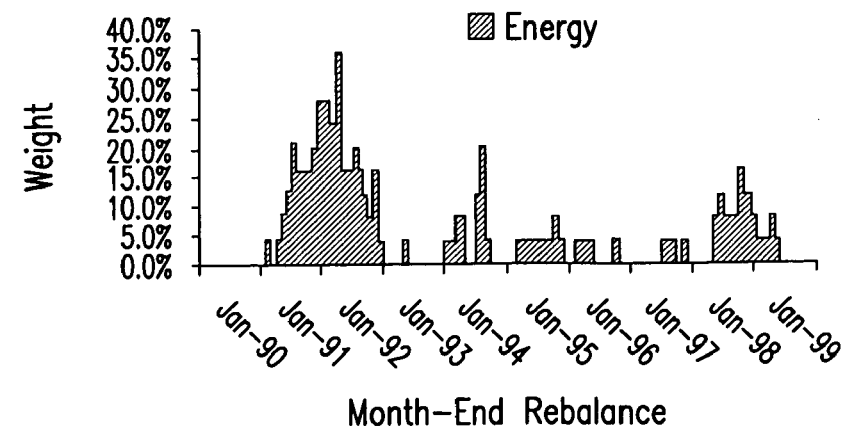
Figure 36G:
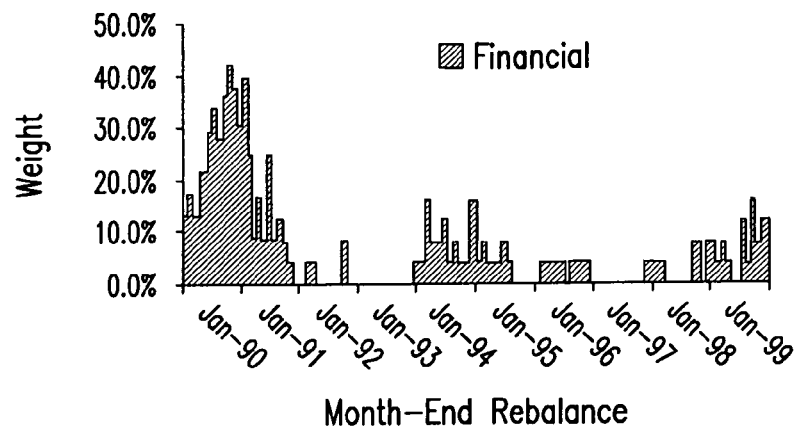
Figure 36H:
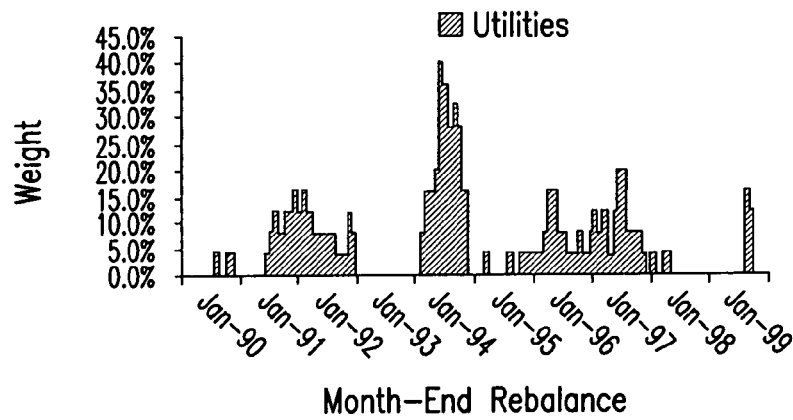
Figure 36I:
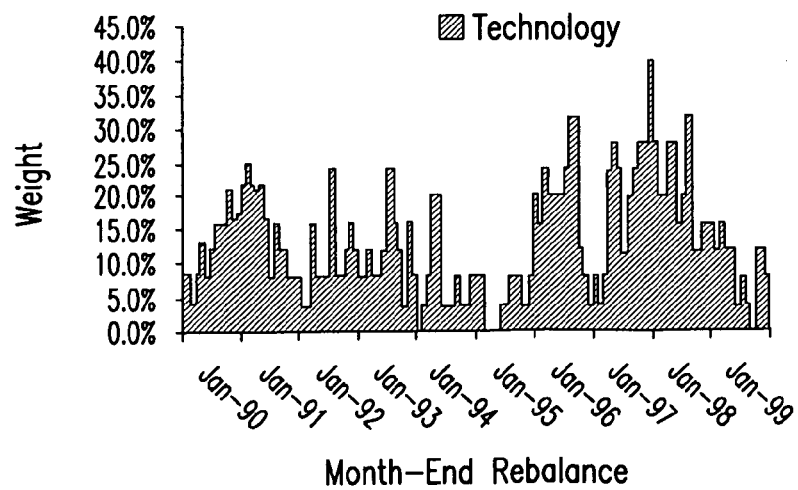
Figure 36J:
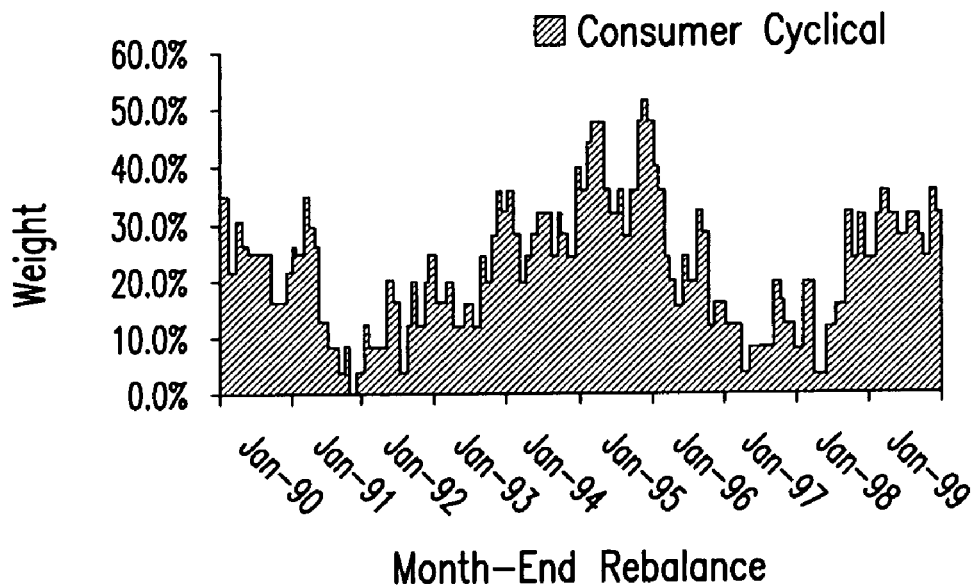
Figure 36K:
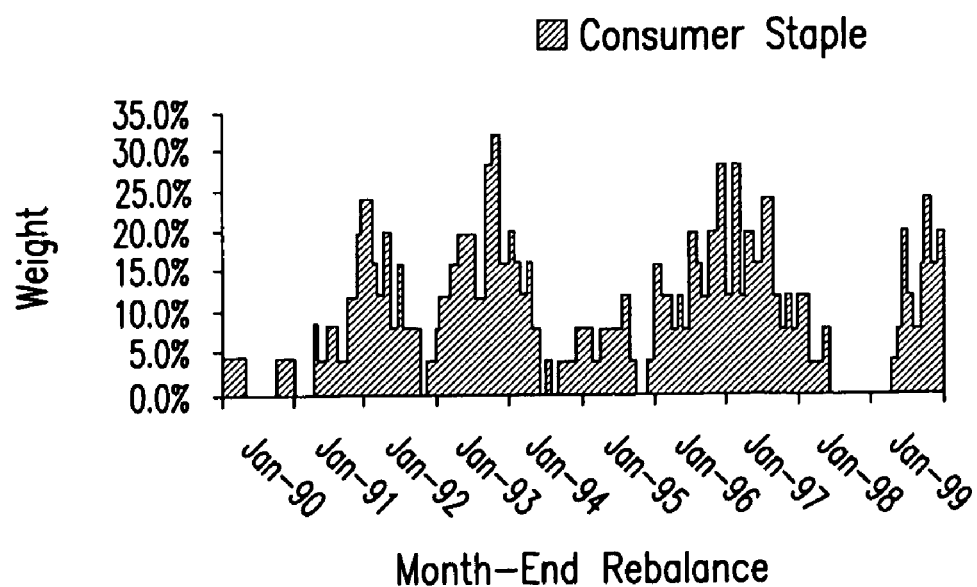
Figure 37A:
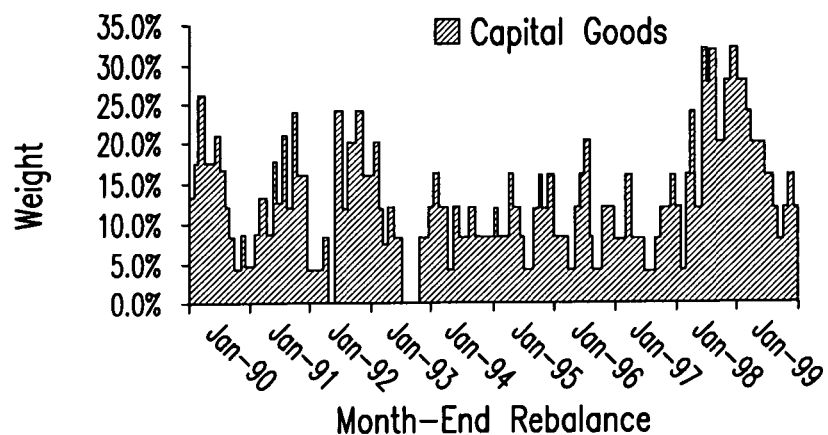
Figure 37B:
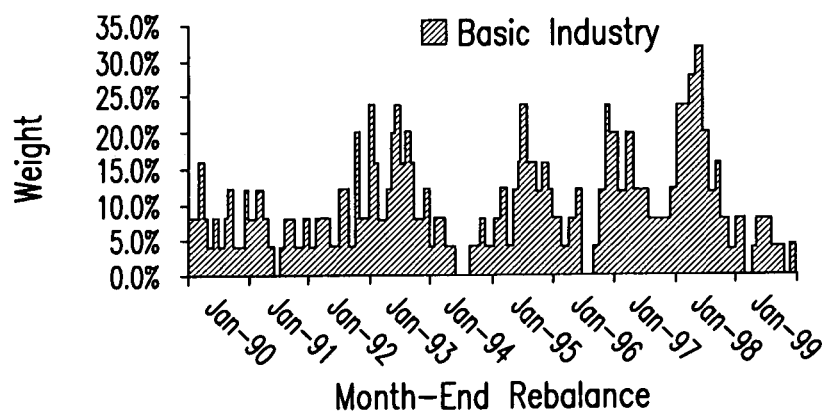
Figure 37C:
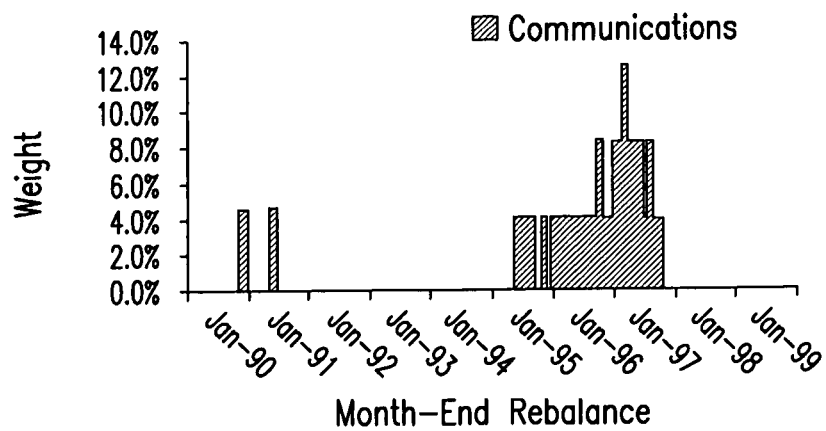
Figure 37D:
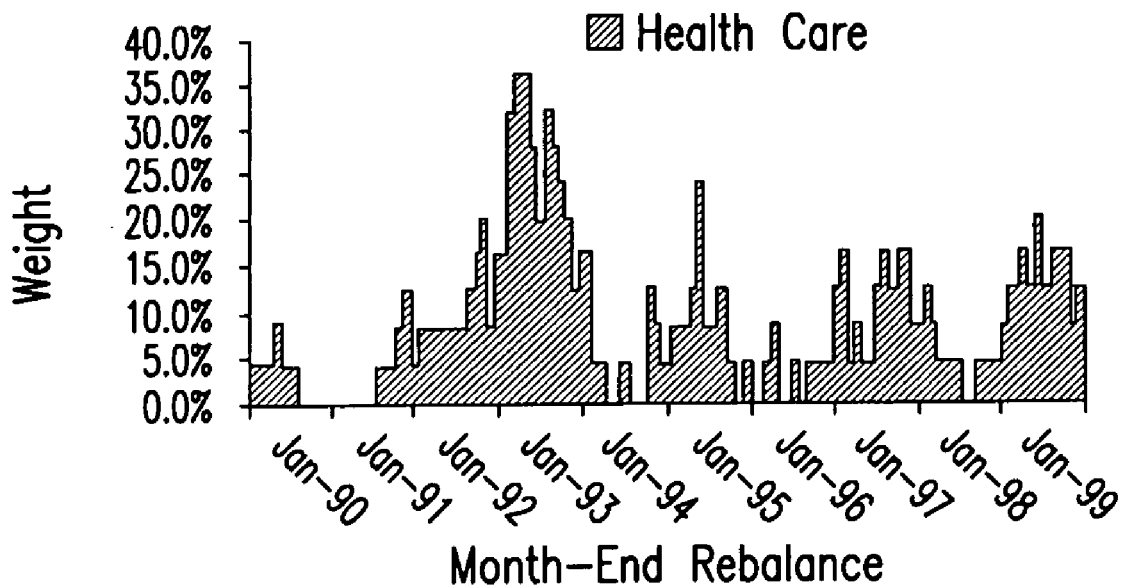
Figure 37E:
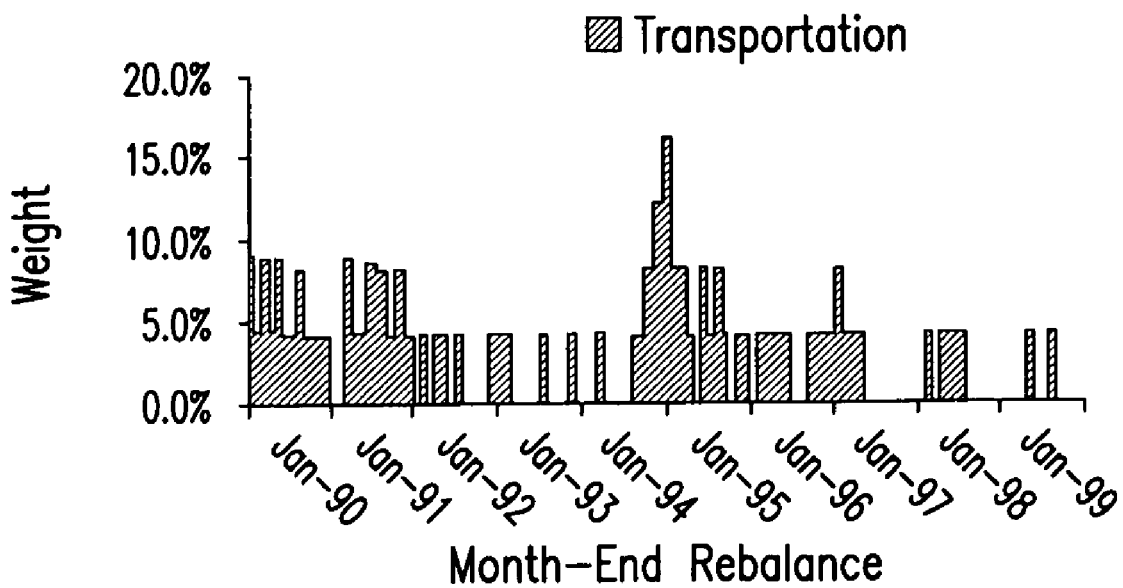

FIG. 34 shows the aggregate returns of winners of the EM process vs. the average returns of the S&P 500 for a six-month holding period after each month-end rebalance date (1990-1999).

For the S&P 500 stocks, seasonal trends for the three-month and six-month holding periods play a definite role in the performance of the strategy. Losers perform especially well over the next three months after the portfolio is rebalanced at the end of December, January, February and March (FIGS. 23 and 24). The rally of the portfolio of losers during the early part of the year after the month-end December and January rebalance may reflect the potential rally of tax-loss-related losers from the previous year, better known as the "January effect." Historically, the losers' portfolios for the month-end rebalance of January, February and March tend to include stocks in the Consumer Cyclical sector and some stocks in the Basic Industry sector (some basic material stocks) that historically rally in the first half of the year. Moreover, fund managers generally have significant cash inflows during the months of March and April (possibly related to income tax refunds and IRA funding), which may explain the rally of some value-related loser stocks. Finally, during the summer months, the winners tend to outperform the traditionally lackluster returns of the U.S. market (S&P 500 index). Over the aggregate, the results are similar as shown in FIGS. 29 and 30. However, October for the six-month holding period (FIGS. 30 and 32) shows large negative returns due to winning stocks that appear in the losers portfolio after market corrections that may occur in August, September and October.

As shown in FIGS. 35A-F and 36A-E, the EM portfolio of winners for the S&P 500 were separated into their respective S&P 500 sectors historically over the last 10 years. The role of stocks in the Energy, Transportation, Utilities and Communications sectors has decreased historically in the portfolio of winners, while the role of the stocks in the Technology, Financial, Consumer Cyclical, Capital Goods and Health Care sectors has increased historically in the portfolio of winners. Recently in 1999, one may appreciate that stocks in the Technology sector have increased along with the returns of the portfolio of winners, while the role of stocks in the Consumer Cyclical, Consumer Staple and Health Care sectors in the portfolio of winners has decreased.

FIGS. 35A-F show the historical weights of each S&P 500 sector for each possible month-end formation date of the year for the winners portfolio of the EM Process (1990-1999).

FIGS. 36A-E show the historical weights of each S&P 500 sector for each possible month-end Formation Date of the Year for the winners Portfolio of the EM Process (1990-1999) (Continued).

As shown in FIGS. 36F-K and 37A-E, the portfolio of losers for the EM process was separated into S&P 500 sectors historically over the last 10 years. The role of the stocks in the Financial, Health Care and Basic Industry sectors has decreased recently compared to their historical influence on the losers. Recently in 1999, one also can see that the role of stocks in the Consumer Cyclical sector has increased for the portfolio of losers. Seasonal trends appear in the portfolio of losers at the beginning of each year (January to March) due to an increase in the number of stocks in the Consumer Cyclical and Basic Industry sectors.

FIGS. 36F-K show the historical weights of each S&P 500 sector for each possible month-end formation date of the year for the losers portfolio of the EM process (1990-1999).

FIGS. 37A-F show the historical weights of each S&P 500 sector for each possible month-end formation date of the year for the losers portfolio of the EM process (1990-1999) (continued).

The method of holding the winners long and the losers short as determined by the EM process performs well as a defensive strategy during market declines. To show these results of this method, the performance of the winners and the losers of the EM process during the market corrections in August 1998 (large correction), October 1997 (medium correction) and January 2000 (small correction) for the S&P 500 are reviewed. For this analysis, the returns from the beginning of the three- or six-month holding period until the day of the market correction for six different scenarios are measured. The six scenarios recognize the possibility that the winners and losers portfolios of the EM process may be created in any one of the six months preceding the October 1997, August 1998 and January 2000 market corrections. For example, during the large market correction of Aug. 31, 1998, the long winners and short losers strategy of the EM process for the S&P 500 had positive returns compared to the loss incurred by the S&P 500 index.

The market correction of Aug. 31, 1998 for the S&P 500 was more than 14% from August 1 to Aug. 31, 1998. For the S&P 500, the portfolio was rebalanced on the last trading day of February, March and April 1998 for the six-month holding period and the last trading day of May, June and July 1998 for the three-month or six-month holding periods. The returns from the beginning of each holding period through the market correction on Aug. 31, 1998, were measured. For each of the prior six months leading up to the market correction of Aug. 31, 1998, FIG. 38 shows the returns of portfolios for the winners and losers of the EM process with the returns of the S&P 500 as the benchmark. In this market correction, losers generally went down by more than the winners.

Figure 38A:
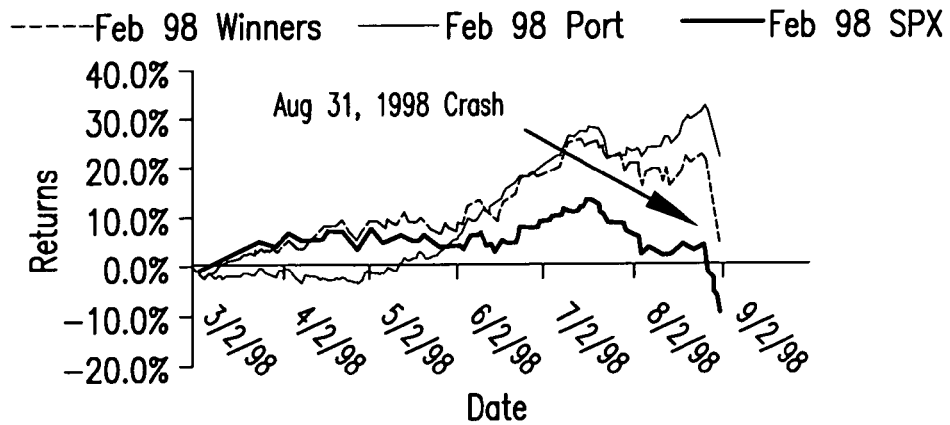
Figure 38B:
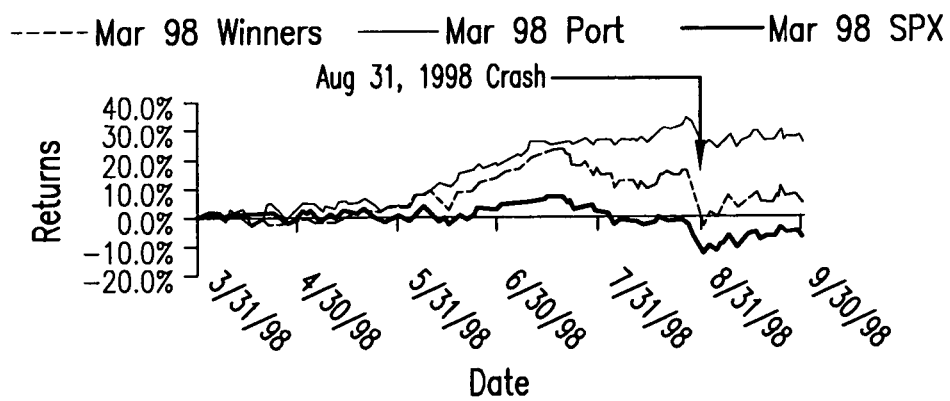
Figure 38C:
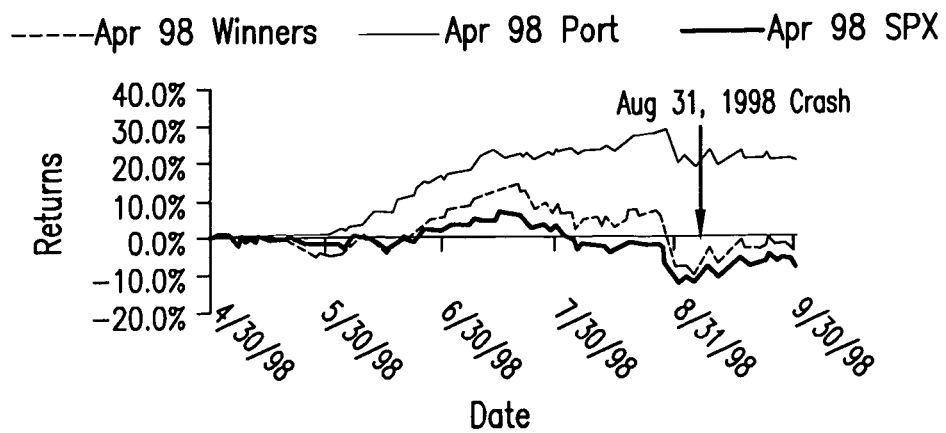
Figure 38D:
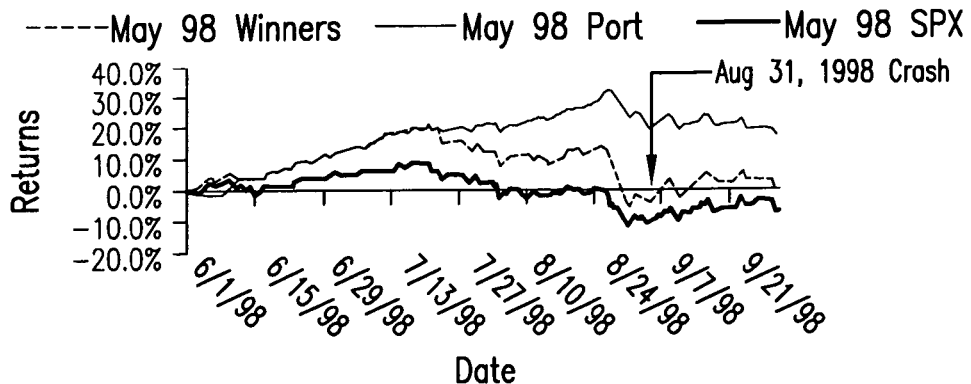
Figure 38E:
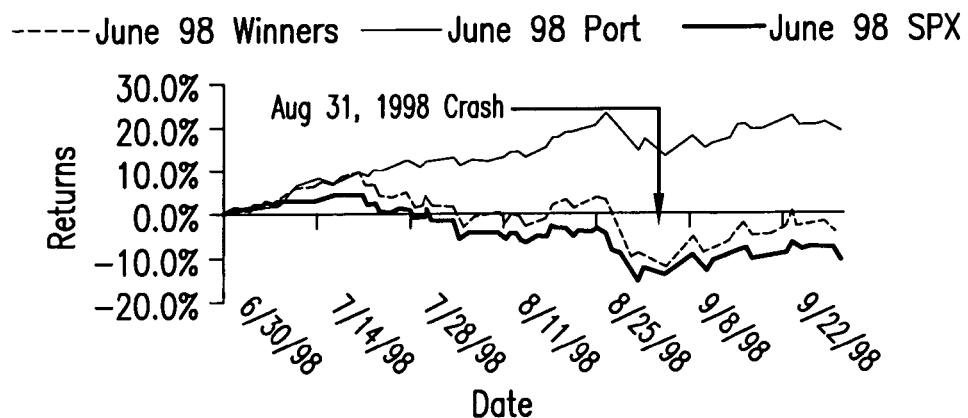
Figure 38F:
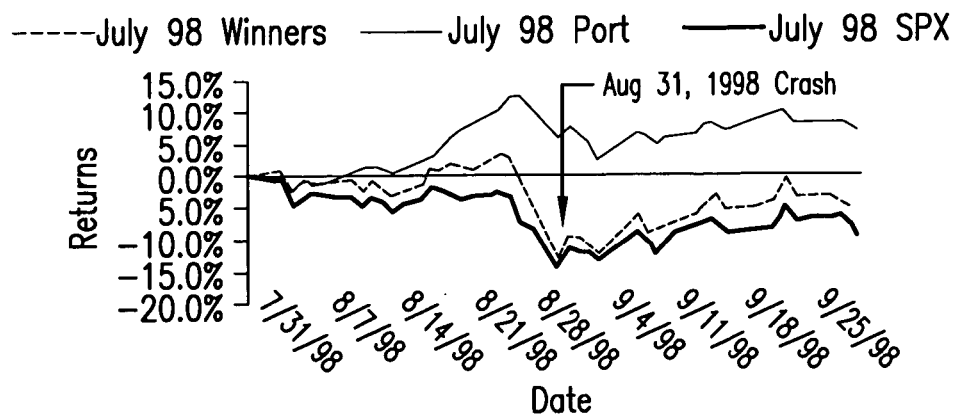

For example, FIG. 38A shows the returns of the winners of the EM process (February 1998 winners) and the returns of the February long winners and short losers portfolio from the EM process (February 1998 Port) after the portfolio formation on Feb. 27, 1998. These returns are then compared to the returns of the S&P 500 (February 1998 SPX) over the same period. The February 1998 portfolio would expire on Aug. 31, 1998. Other graphs (FIGS. 38B-F) show not only the returns to the date of the correction, but also the returns of the strategy one-month after the correction (to further examine the robustness of the strategy).

As shown in FIGS. 38A-F, the winners and losers strategy of the EM process is robust during the market correction of August 1998. In addition, the winners and losers strategy for the market correction was not merely a calendar quarter-end or month-end phenomenon. In general, the strategy shows that it does not matter when the rebalance occurs for either the three- or six-month holding period for the S&P 500 in order to obtain similar returns during the market correction in August 1998.

FIGS. 38A-F show the returns of the six possible winners and losers portfolios compared to the S&P 500 Benchmark from the creation of the portfolio through the market correction of Aug. 31, 1998.

The winners (alpha) portfolio outperformed the S&P 500 index in nearly all six scenarios during the market correction in August 1998. The gain from the short losers strategy was greater than the loss from the long winners strategy, which resulted in positive returns for the winners and losers strategy of the EM process (losers went down by more than winners). The positive returns for both strategies outperformed the negative returns of the S&P 500 index. The winners provided comfort during a large market correction because the winners declined by less than the losers. In fact, the loss incurred by the winners of each index was less than or close to the loss incurred by the S&P 500 depending on the month of the rebalance.

During the market correction of August 1998 for the Jul. 31, 1998 rebalance, the winners portfolio of the S&P 500 (rebalanced on Jul. 31, 1998) contained some of the following S&P 500 sectors: Technology (computers, software, hardware and peripherals); Communications (telecommunications); Financials; Health Care; Consumer Staples (TV, broadcasting and entertainment); and some Consumer Cyclicals (general retailers). The losers portfolio of the S&P 500 (rebalanced on Jul. 31, 1998) contained some of the following S&P 500 sectors: Basic Industry (metals, mining and construction); Capital Goods (machinery and electrical equipment), Energy (oil and gas); Consumer Cyclicals (leisure time products and specialty retailers) and some Technology (bad performers).

For the medium market correction of October 1997, the long winners and short losers strategy of the EM process for the S&P 500 performed better than the S&P 500 index in five out of six scenarios.

The market correction of Oct. 27, 1997 for the S&P 500 was more than 7% from Oct. 1, 1997 to Oct. 27, 1997. The October 1997 market correction had a quicker recovery unlike the market correction in August 1998. For the S&P 500, the portfolio was rebalanced on the last trading day of April, May and June 1997 for the six-month holding period and the last trading day of July, August and September 1997 for the three-month or six-month holding periods. The returns were measured from the beginning of each holding period through the market correction on Oct. 27, 1997. FIG. 39 shows the returns of the winners and losers of the EM process with the returns of the S&P 500 as the benchmark during the correction in October of 1997.

Figure 39A:
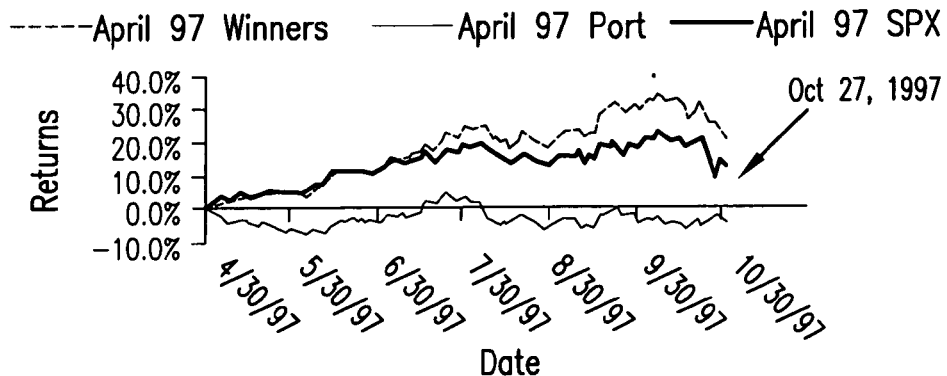
Figure 39B:
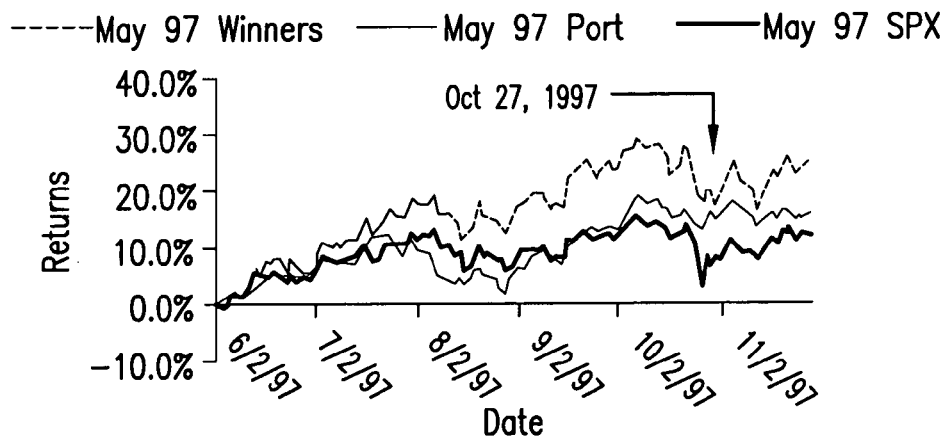
Figure 39C:
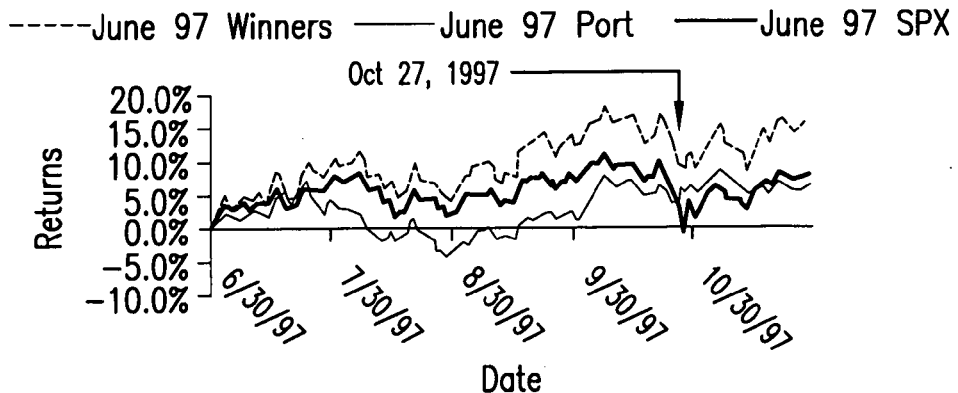
Figure 39D:
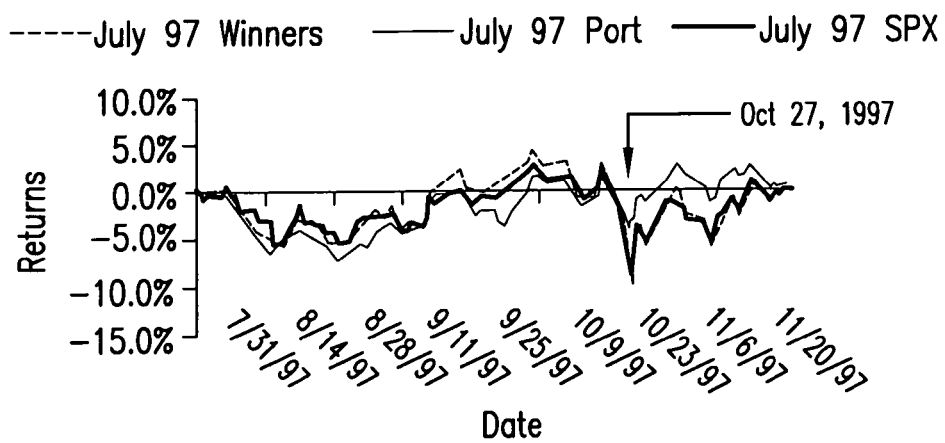
Figure 39E:
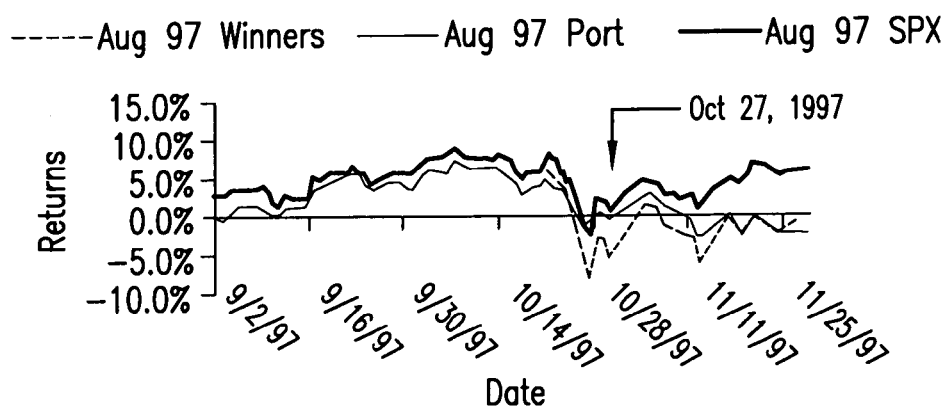
Figure 39F:
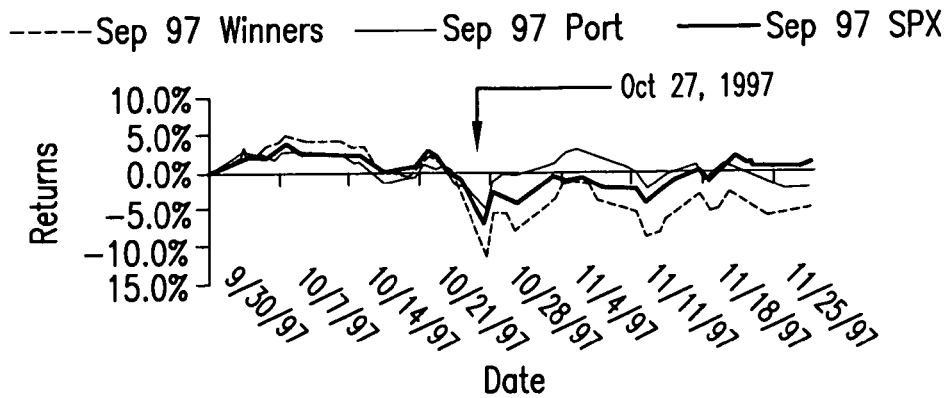
Figure 40A:
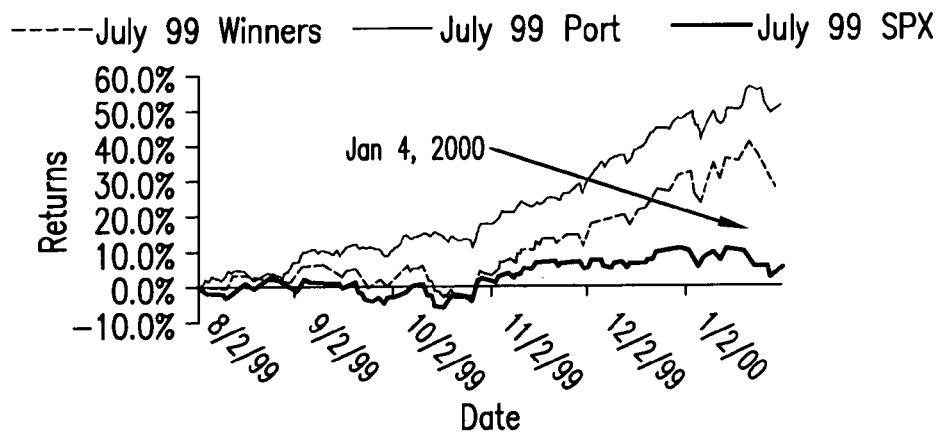
Figure 40B:
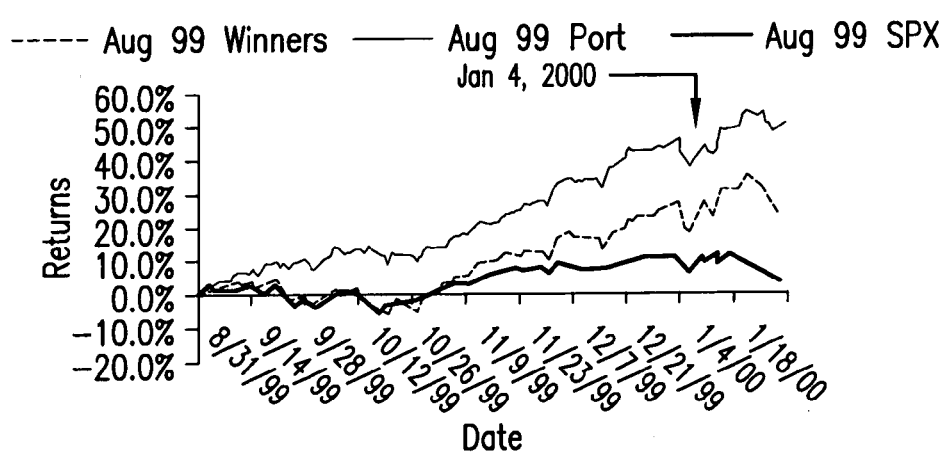
Figure 40C:
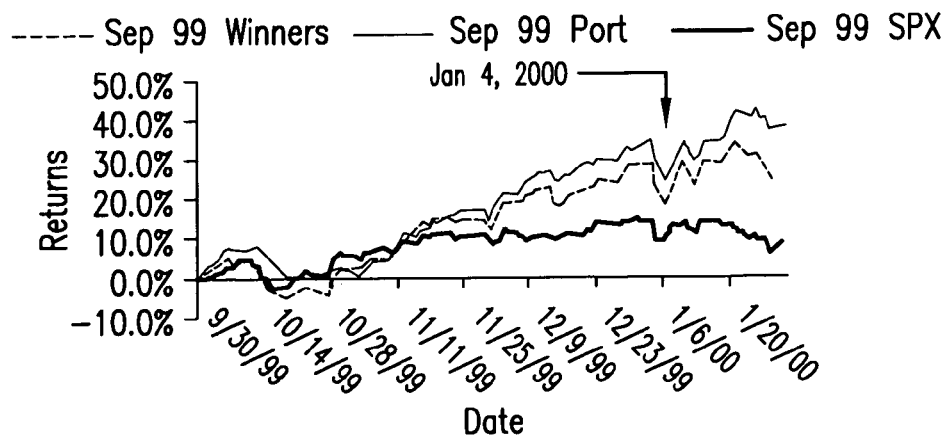
Figure 40D:
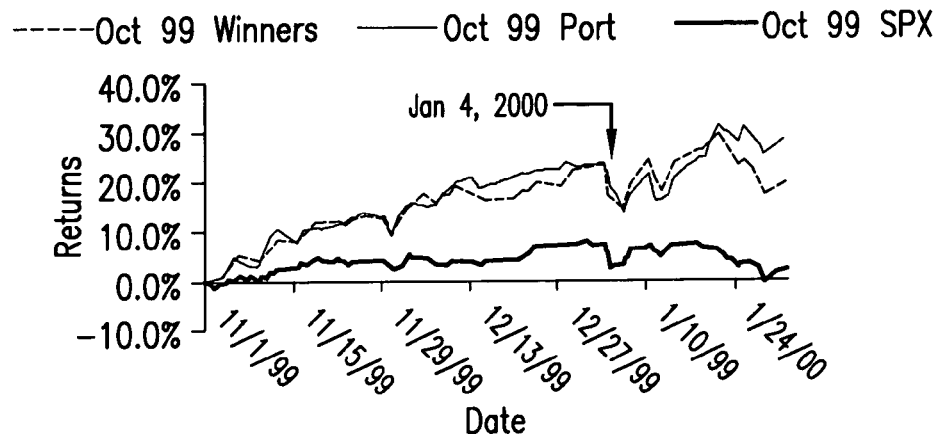
Figure 40E:
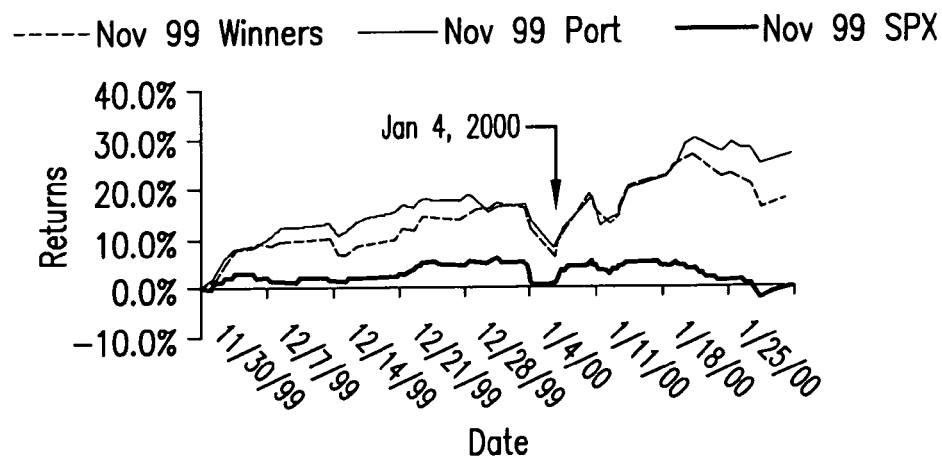
Figure 40F:
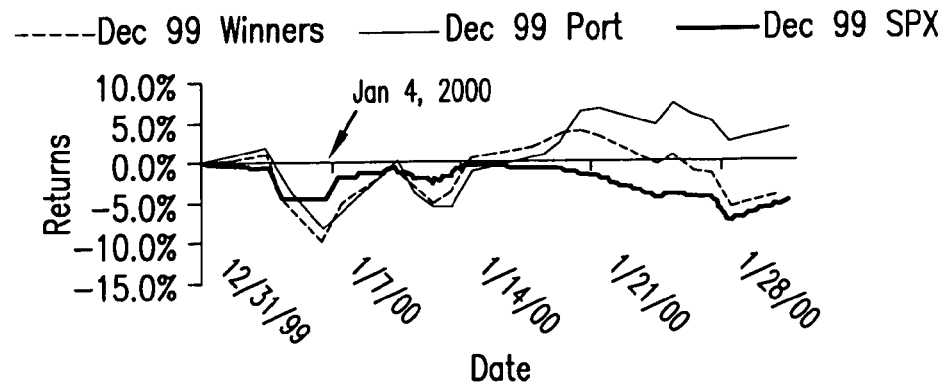

As shown in FIGS. 39A-F, the long winners and short losers of the EM process would do better than the S&P 500 index except in the May 1 to Oct. 27, 1997 holding period (FIG. 39A). After closer inspection of the May 1 to Oct. 27, 1997 holding period, the portfolio of losers contained many stocks in the Technology and Communications sector that consequently rallied during the holding period. However, only two out of six scenarios had positive returns for the long winners and short losers strategy using the EM process. Winners of the EM process outperformed the S&P 500 index in three out of six scenarios. In this market correction, winners generally went down by more than the losers unlike the market correction of August 1998.

FIGS. 39A-F show the returns of the six possible winners and losers portfolios compared to the S&P 500 benchmark from the creation of the portfolio through the market correction of Oct. 27, 1997.

For the smaller market correction of January 2000, the long winners and short losers strategy for the S&P 500 performed better than the S&P 500 index in five out of six scenarios. The market correction of Jan. 4, 2000 for the S&P 500 was approximately 4% from Jan. 3, 2000 to Jan. 4, 2000, which was much smaller than the corrections in October 1997 and August 1998. The January 2000 market correction had a very quick recovery unlike the market correction in August 1998 and October 1997. For the S&P 500, the portfolios were rebalanced on the last trading day of July, August and September of 1999 for the six-month holding period and the last trading day of October, November and December of 1999 for the three-month or six-month holding periods. The returns were measured from the beginning of each holding period through the market correction on Jan. 4, 2000. FIGS. 40A-F show the returns of the winners and losers of the EM process with the returns of the S&P 500 as the benchmark during the January 2000 correction.

The winners (alpha) portfolio outperformed the S&P 500 index in five out of six scenarios during this smaller market correction in January of 2000. As shown in FIGS. 40A-F, one would do better than the S&P 500 index except in the Dec. 31, 1999 to Jan. 4, 2000 holding period with the long winners and short losers strategy of the EM process during and after the market correction in January 2000. In addition, winners outperformed the S&P 500 in five out of six scenarios. In this market correction, winners generally went down by more than the losers. Winners were dominated by stocks in the Technology sector with a few stocks in the Basic Industry, Consumer Staple and Capital Goods sectors. The stocks in the Technology sector generally rallied quickly after the correction on Jan. 4, 2000. The losers were dominated by stocks in the Consumer Cyclical, Consumer Staples and Healthcare sectors with a few stocks in the financial sector.

FIGS. 40A-F show the returns of the six possible winners and losers portfolios compared to the S&P 500 benchmark from the creation of the portfolio through the market correction of Jan. 4, 2000.

The following describes various hedge funds and enhanced index trading strategies.

For a hedge fund, the long winners and short losers strategy of the EM process works best during the summer month-end portfolio formation periods of April, May, June, July and August for both the quarterly and half-year holding periods. Accordingly, four possible trading strategies around these five months may be used. First, one strategy includes long the portfolio of winners and short the portfolio of losers during these months. Second, the investor may enter into a long swap on the portfolio of winners and a short a swap on the portfolio of losers. Third, the investor may buy calls or sell puts on the portfolio of winners or the individual winner stocks and buy puts or sell calls on the portfolio of losers or the individual loser stocks. Finally, the investor could purchase just an alpha portfolio of winners, which outperforms the S&P 500 with a higher Sharpe ratio (higher returns with lower risk) than the S&P 500.

Figure 43:
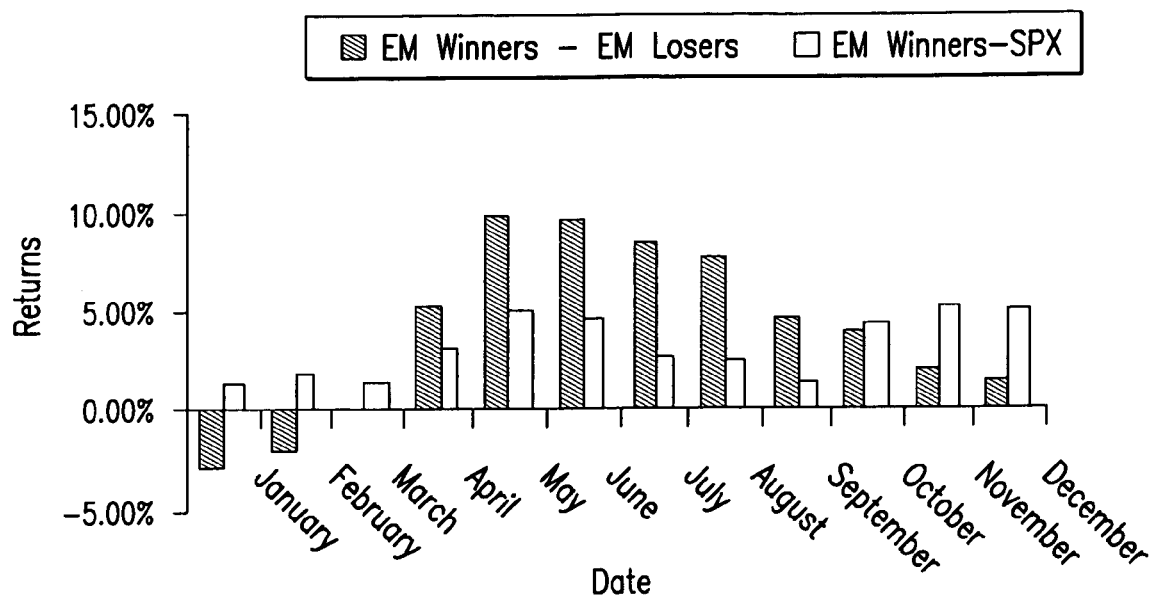
Figure 44:
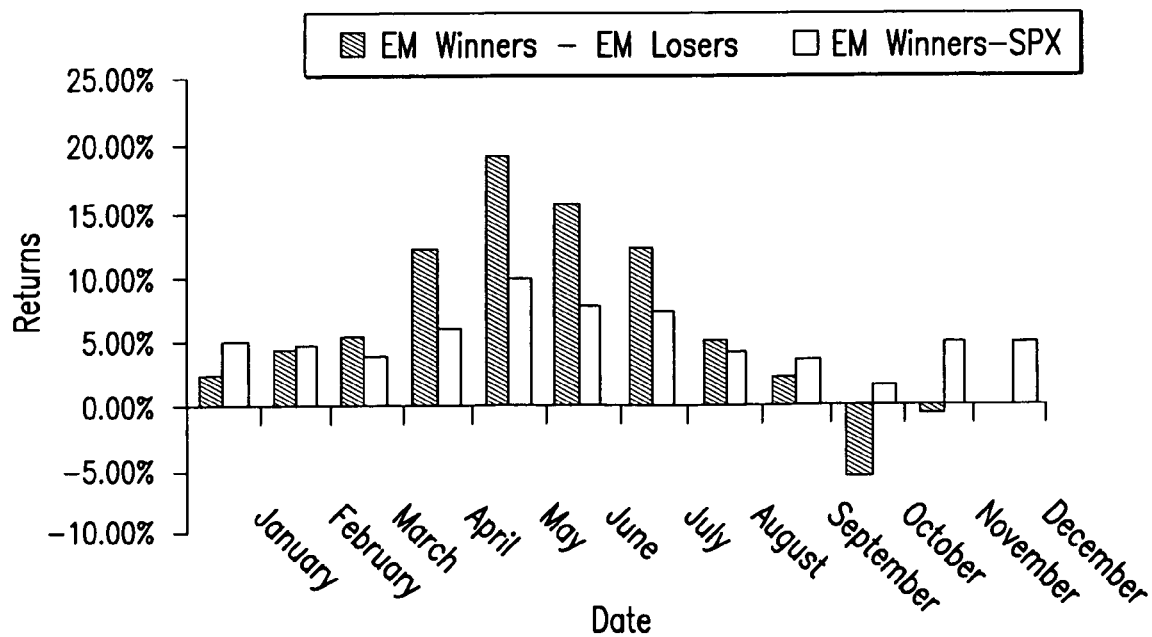

Long the winners and short the S&P 500 Futures or Index may work better for the month-end portfolio formation periods of January, February, March, September, October, November, and December. The winners have a higher Sharpe ratio and provide higher returns with lower risk than the returns of the S&P 500 index except for the February/August half-year portfolio rebalance. Therefore, one may short S&P 500 Futures (or sell S&P 500 calls or buy S&P 500 puts) instead of shorting the portfolio of losers to minimize the potential loss and provide higher returns as shown in FIGS. 41 and 42. After the month-end rebalances of January, February, March, September, October, November and December, the average returns for a three-month (six-month) holding period for the long winners and short losers Strategy is 1.0% (1.20%) while the average returns of the long winners and short S&P 500 Strategy is 2.8% (4.1%). Therefore, for those seven months, the long winners and short S&P 500 Futures Strategy enhances the average returns per year compared to the long winners and short losers strategy as shown in FIGS. 43 and 44.

FIG. 41 shows the average return of three-month holding period of the EM process for the S&P 500 (1990-1999).

Alternatively, the investor may decide to enter outright into a long winners and short S&P 500 Futures Strategy for a quarterly and half-year rebalancing period. The investor could use similar trade entry methods outlined above for the long winners and short losers strategy.

FIG. 42 shows the average return of a six-month holding period of the EM process for the S&P 500 (1990-1999).

FIG. 43 shows the average return of long winners and short losers of the EM process for the S&P 500 versus long EM winners and short the S&P 500 for a three-month holding period (1990-1999).

FIG. 44 shows the average return of long winners and short losers of the EM process for the S&P 500 versus long EM winners and short the S&P 500 for a Six-Month Holding Period (1990-1999).

The following provides trading strategies for enhanced index managers. An enhanced index fund could reduce their exposure to the losers of the S&P 500 and increase their exposure to the winners of the S&P 500. For this example, the selected alpha portfolio of winners from the EM process to enhance the returns of the S&P 500 index is used. However, most enhanced index fund managers have constraints that must be followed in order to enhance the S&P 500 index. Since only changing 25 stocks, the weights of the 25 winners of the S&P 500 using the EM process are increased. The following sample set of index constraints for an enhanced index fund are assumed:

1. The maximum increase to the weight of each individual winners will not exceed 35% of its original weight;
2. The absolute change in the weight of the individual stocks will not exceed 3%;
3. The maximum increase to each S&P 500 Sector weight will not exceed 35% of its original weight. Otherwise, the excess percentage will be redistributed throughout the S&P 500 sector by adjusting the weights by market capitalization;
4. The absolute change in the weight of an individual S&P 500 sector will not exceed 3%; and
5. The weight increase will be redistributed by reducing the weights of the stocks in the S&P 500 excluding the winners. No individual stock or sector weight can be reduced by more than 35% or by an absolute value of more than 3%.

In addition, a fixed portfolio of the S&P 500 was compared to the enhanced S&P 500 using the EM winners for each month-end rebalance from January 1998 to December 1999 for both the three- and six-month holding periods. The fixed S&P 500 index did not reflect the adds or deletes of the S&P 500 index or any individual reweights or adjustments that may occur during the holding period.

The index was reconstructed back two years (January 1998 to December 1999) and determined if the enhanced S&P 500 index using the EM winners outperforms a fixed S&P 500 index. As shown in FIG. 45 and FIG. 46, one can create an enhanced S&P 500 index using the EM winners that outperforms the returns of a fixed S&P 500 index, on average, over the last two years using a sample set of index enhancement constraints that we previously outlined.

FIG. 45 shows the annual excess return of the enhanced S&P 500 index using the EM winners over the fixed S&P 500 index for three-month holding periods (1998-1999).

FIG. 46 shows the annual excess return of the enhanced S&P 500 index using the EM winners over the fixed S&P 500 index for six-month holding periods (1998-1999).

As shown in FIGS. 47 and 48, the enhanced S&P 500 index using the EM winners has a low tracking error when compared to the fixed S&P 500 index. In addition, the tracking error is low when compared to the potential enhancement to the index. The excess returns using this strategy are small because only 25 names are changed in the index but the strategy indicates better performance with a minimum impact on the tracking error (note: this analysis uses BARRA, Inc. tracking error and excludes transaction costs). Here, there is room to increase the weights by more than 35% because of the low tracking error.

FIG. 47 shows an annualized tracking error of an EM enhanced S&P 500 index over the fixed S&P 500 index for three-month holding periods (1998-1999).

FIG. 48 shows an annualized tracking error of an EM enhanced S&P 500 index over the fixed S&P 500 index for six-month holding periods (1998-1999).

Figure 49:
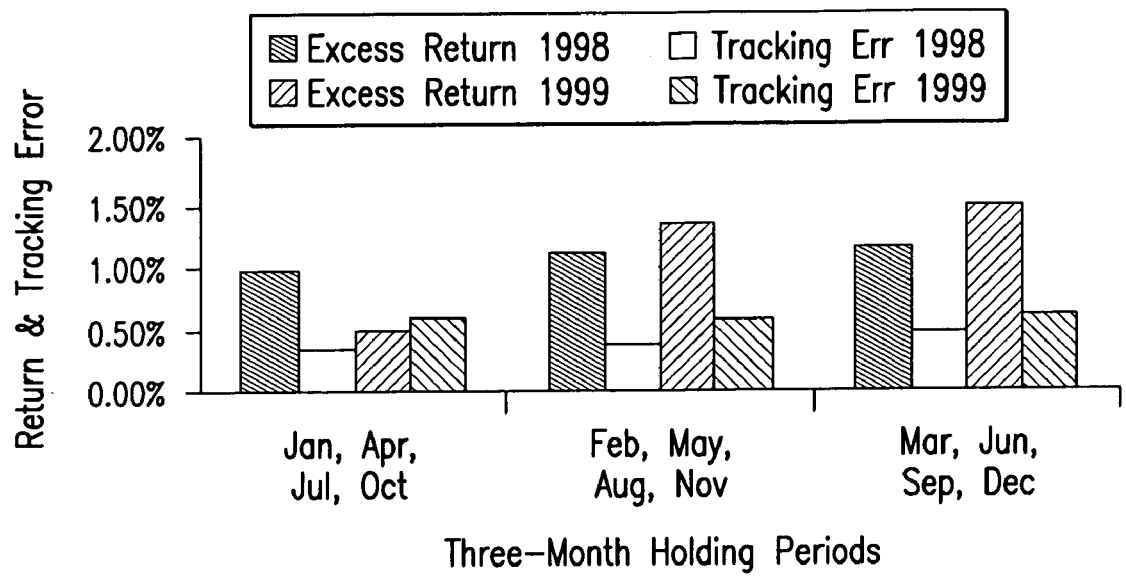
Figure 50:
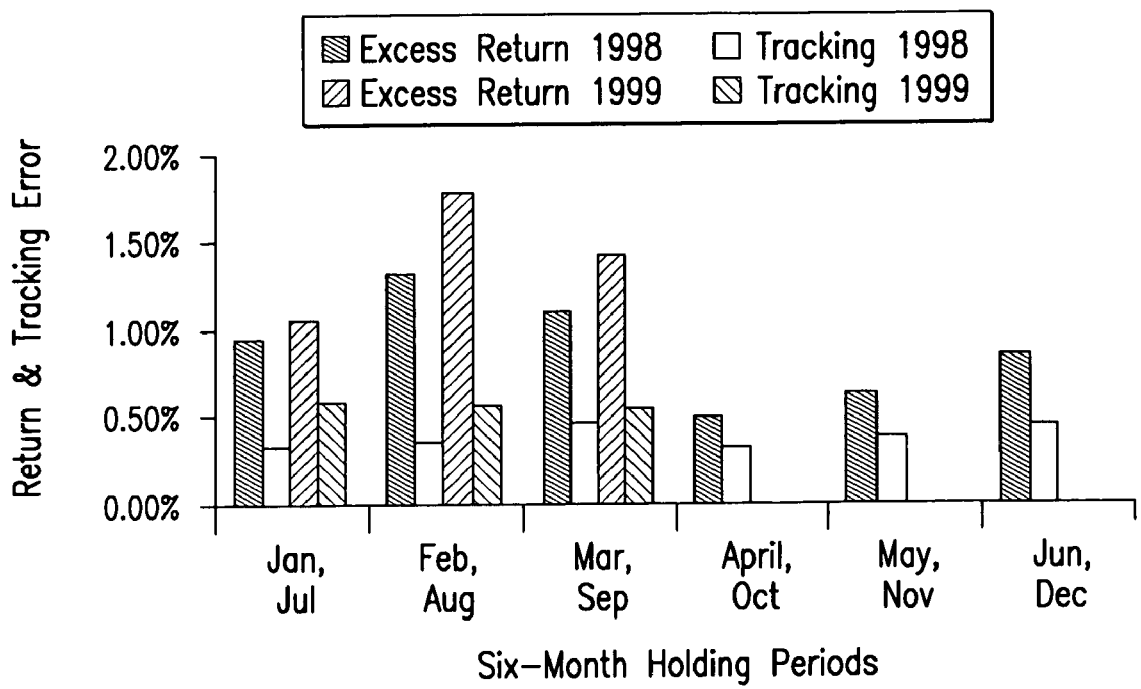

FIGS. 49 and 50 show a summary of the returns versus tracking error from 1998 to 1999. An enhanced S&P 500 index was created that outperforms a fixed S&P 500 index on a quarterly (half-year) basis by 107 basis points (97 basis points) per year, on average, over the last two years from 1998 to 1999 with an annualized tracking error of 49 basis points (44 basis points) measured by BARRA, Inc.

FIG. 49 shows a comparison of returns versus tracking error for three-month holding period (1998-1999).

FIG. 50 shows a comparison of returns versus tracking error for six-month holding period (1998-1999).

In sum, it has been shown that the winners and losers of the Enhanced Momentum (EM) process outperform a Basic One-Year Price Momentum Process on average. The winners of the EM process for the S&P 500 outperformed the comparable index returns of the S&P 500 by 10.1% (9.2%) per year for quarterly (half-year) holding periods on average over the last 10 years (1990-1999). In addition, it has been shown that the Sharpe ratio of the winners portfolio is higher than the Sharpe ratio of the S&P 500 for the three- and six-month holding periods, indicating a portfolio of higher returns and lower risk than the S&P 500. In addition, the long winners and short losers strategy outperformed the returns for LIBOR, on average, for both the three- and six-month holding periods. In general, it has been found that the distribution of the yearly returns from the strategy for each year over the last 10 years shows that the EM long/short Strategy works well and that the yearly returns of the winners still outperform the returns of the S&P 500 index from 1990 to 1999.

In general, the winners and losers Strategy of the EM process works best after the month-end rebalance of April through October for a three-month holding period and April through August for a six-month holding period. In addition, seasonal trends play an important role in the overall performance of the strategy. After the month-end rebalance in December, January and February, losers tend to perform better on average over a three- and six-month holding periods due to the potential rally of tax-loss-related losers from the previous year. For January, February and March, the portfolio of losers tend to include stocks in the Consumer Cyclical Sector and some stocks in the Basic Industry sector (some basic material stocks) that historically rally in the first half of the year. Moreover, winners outperform the returns of S&P 500 index on average and over the aggregate in every month for both the three- and six-month holding periods and especially after the month-end rebalance of April, May, June, July and August. Finally, for three- and six-month holding periods, this strategy works over a full year no matter when the quarterly or half-year rebalance of the portfolios occurs on average or over the aggregate.

The winners of the EM process have shown an increase in the number of stocks in the Technology sector and a decrease in number of stocks in the Consumer Cyclical sector from 1990 to 1999. The losers of the EM process have shown an increase number of stocks in the Consumer Cyclical and Capital Goods sectors and a recent decrease in the number of stocks in the Technology sector from 1990 to 1999.

During the large market correction on Aug. 31, 1998, the winners and losers strategy of the EM process for the S&P 500 had positive returns compared to the losses incurred by the S&P 500 index. For the market correction in August 1998, the winners provided comfort during the market correction because the winners declined by less than the losers. In addition, it was showed the robustness of the strategy for the medium market correction in October 1997 and the smaller market correction in January 2000 within the context of the "Momentum Life Cycle" of a stock or portfolio for the S&P 500. In general, the loss incurred by the winners of each index was less than or close to the loss incurred by the respective index (the S&P 500) depending on the month of the rebalance for the market corrections in August 1998, October 1997 and January 2000.

The present invention presents various strategies for the hedge fund investor and enhanced index fund managers. For hedge funds, the average returns were improved using a the long winners and short losers S&P 500 strategy for a three- and six-month holding periods after the month-end rebalance of January, February, March, September, October, November and December. For an enhanced index fund, an enhanced S&P 500 index was created that outperforms a fixed S&P 500 index on a quarterly (half-year) basis by 107 basis points (97 basis points) per year, on average, over the last two years from 1998 to 1999 with an annualized tracking error of 49 basis points (44 basis points) using information from BARRA, Inc. Accordingly, the present invention provides the ability for investors to create strategies for all seasons depending how the investor wants to use the present invention.

The present invention is described in relation to stock trading. Other tradable issues may be analyzed using the present system as well. For example, the present system may be applied to trading in other markets. Other modifications will be apparent to those of ordinary skill in the art without departing from the scope of the invention.

We claim:

1. A computerized method comprising the steps of:
   first, electronically receiving and storing data regarding performance over a selected previous time period of all securities in a selected group of securities;
   second, dividing said group of securities into subgroups based on net price performance over said time period, so that a first subgroup comprises securities with net price performance over said time period greater than or equal to securities in all other subgroups of said group, and a second subgroup comprises securities with net price performance over said time period less than or equal to securities in all other subgroups of said group; and
   third, applying, by a computer, a volume/turnover filter to said first subgroup and said second subgroup, wherein said volume/turnover filter is operable to calculate a change in turnover over said time period for each security in said first and second subgroups based on volume data, and divide said first subgroup and said second subgroup into further subgroups according to said change in turnover.

2. A method as in claim 1, wherein:
   (a) said further subgroups of said first subgroup consist of a third subgroup and a fourth subgroup, and wherein each security in said third subgroup has a change in turnover less than or equal to a change in turnover for any security in said fourth subgroup; and
   (b) said further subgroups of said second subgroup consist of a fifth subgroup and a sixth subgroup, and wherein each security in said fifth subgroup h's a change in turnover less than or equal to a change in turnover for any security in said sixth subgroup.

3. A method as in claim 1, further comprising investing long in one or more of said third subgroup.

4. A method as in claim 2, further comprising investing short in one or more of said sixth subgroup.

5. A method as in claim 3, further comprising investing short in an index fund.

6. A method as in claim 4, further comprising investing long in an index fund.

7. A method as in claim 1, wherein calculating said change in turnover comprises calculating a turnover slope using regression.

8. A method as in claim 1, wherein said volume/turnover filter is operable to calculate said change in turnover based on average daily volume over one or more specified time periods divided by total number of shares outstanding.

9. A method as in claim 8, wherein said volume/turnover filter is further operable to calculate said change in turnover based on calculating one or more changes in said average daily volume over one or more of said specified time periods divided by total number of shares outstanding, and summing said changes.

10. A method as in claim 2, further comprising investing long in one or more of said third subgroup and short in one or more of said sixth subgroup.

11. A method as in claim 10, wherein said investing long is for a first specified holding period and said investing short is for a second specified holding period.

12. A method as in claim 11, wherein said first and second specified holding periods are determined based on market volatility.

13. A method as in claim 11, wherein said first and second specified holding periods are determined based on an in investor's desired level of risk.

14. A method as in claim 1, wherein said group is selected based on volatility.

15. A method as in claim 1, wherein said group is selected based on market capitalization.

16. A method as in claim 1, wherein said previous time period is selected based on data regarding seasonal trends.

17. A computer system comprising one or more processors in communication with each other, if a plurality, and operable to:

- electronically receive and store data regarding performance over a selected previous time period of all securities in a selected group of securities;
- divide said group of securities into subgroups based on net price performance over said time period, so that a first subgroup comprises securities with net price performance over said time period greater than or equal to securities in all other subgroups of said group, and a second subgroup comprises securities with net price performance over said time period less than or equal to securities in all other subgroups of said group; and
- apply a volume/turnover filter to said first subgroup and said second subgroup, wherein said volume/turnover filter is operable to calculate a change in turnover over said time period for each security in said first and second subgroups based on volume data, and divide said first subgroup and said second subgroup into further subgroups according to in turnover.

18. A system as in claim 17, wherein:

(a) said further subgroups of said first subgroup consist of a third subgroup and a fourth subgroup, and wherein each security in said third subgroup has a change in turnover less than or equal to a change in turnover for any security in said fourth subgroup; and (b) said further subgroups of said second subgroup consist of a fifth subgroup and a sixth subgroup, and wherein each security in said fifth subgroup has a change in turnover less than or equal to a chan in turnover for any security in said sixth subgroup.

19. A system as in claim 18, wherein said one or more processors are further operable to invest long in one or more of said third subgroup.

20. A system as in claim 18, wherein said one or more processors are further operable to invest short in one or more of said sixth subgroup.

21. A system as in claim 19, wherein said one or more processors are further operable to invest short in an index fund.

22. A system as in claim 20, wherein said one or more processors are further operable to invest long in an index fund.

23. A system as in claim 17, wherein calculating said change in turnover comprises calculating a turnover slope using regression.

24. A system as in claim 17, wherein said volume/turnover filter is operable to calculate said change in turnover based on average daily volume over one or more specified time periods divided by total number of shares outstanding.

25. A system as in claim 24, wherein said volume/turnover filter is further operable to calculate said change in turnover based on calculating one or more changes in said average daily volume over one or more of said specified time periods divided by total number of shares outstanding, and summing said changes.

26. A system as in claim 18, wherein said one or more processors are further operable to invest long in one or more of said third subgroup and short in one or more of said sixth subgroup.

27. A system as in claim 26, wherein said investing long is for a first specified holding period and said investing short is for a second specified holding period.

28. A system as in claim 27, wherein said first and second specified holding periods are determined based on market volatility.

29. A system as in claim 27, wherein said first and second specified holding periods are determined based on an investor's desired level of risk.

30. A method as in claim 17, wherein said group is selected based on volatility.

31. A method as in claim 17, wherein said group is selected based on market capitalization.

32. A method as in claim 17, wherein said previous time period is selected based on data regarding seasonal trends.

* * * * *